United States Patent
Sawada et al.

(10) Patent No.: US 8,498,644 B2
(45) Date of Patent: Jul. 30, 2013

(54) WIRELESS COMMUNICATION SYSTEM AND HANDOVER METHOD

(75) Inventors: Shinichi Sawada, Osaka (JP); Hirokazu Kobayashi, Osaka (JP); Shigeto Suzuki, Osaka (JP); Kohki Suzuki, Osaka (JP); Akio Yoshihara, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 13/391,789

(22) PCT Filed: Aug. 13, 2010

(86) PCT No.: PCT/JP2010/063756
§ 371 (c)(1),
(2), (4) Date: Feb. 22, 2012

(87) PCT Pub. No.: WO2011/024655
PCT Pub. Date: Mar. 3, 2011

(65) Prior Publication Data
US 2012/0165065 A1    Jun. 28, 2012

(30) Foreign Application Priority Data
Aug. 26, 2009 (JP) ................................ 2009-195710

(51) Int. Cl.
*H04W 36/00* (2009.01)
(52) U.S. Cl.
USPC ........ 455/436; 455/432.1; 455/437; 455/442; 455/556; 455/452.2; 370/329; 370/330; 370/331; 370/332; 370/333
(58) Field of Classification Search
USPC ................. 455/432.1, 434–453, 455–456.3, 455/509, 522; 370/328–334
See application file for complete search history.

(56) References Cited

U.S. PATENT DOCUMENTS

| | | | |
|---|---|---|---|
| 5,309,503 A * | 5/1994 | Bruckert et al. | 455/452.2 |
| 7,145,890 B1 * | 12/2006 | Seo et al. | 370/331 |
| 8,139,603 B2 * | 3/2012 | Fajardo et al. | 370/464 |
| 2002/0137517 A1 * | 9/2002 | Williams et al. | 455/444 |
| 2006/0246911 A1 * | 11/2006 | Petermann | 455/444 |
| 2007/0123265 A1 | 5/2007 | Moon | |
| 2007/0213067 A1 | 9/2007 | Li et al. | |
| 2008/0207170 A1 * | 8/2008 | Khetawat et al. | 455/411 |
| 2011/0103347 A1 * | 5/2011 | Dimou | 370/331 |

FOREIGN PATENT DOCUMENTS

| | | |
|---|---|---|
| JP | 9-51571 A | 2/1997 |
| JP | 2007-97122 A | 4/2007 |
| JP | 2009-124671 A | 6/2009 |
| JP | 2009-529829 A | 8/2009 |

\* cited by examiner

*Primary Examiner* — Dai A Phuong
(74) *Attorney, Agent, or Firm* — Birch, Stewart, Kolasch & Birch, LLP

(57) ABSTRACT

A wireless communication system includes: a macrocell base station device; a micro base station device serving a cell having a region including at least a part of a region of a cell served by the macrocell base station device; and a mobile station device. One of the macrocell base station device and the micro base station device includes a reporter configured to report, to the mobile station device, micro base station information indicating the micro base station device to which the mobile station device can perform a handover. The mobile station device includes a handover destination selector configured to select a handover destination based on the micro base station information reported. Thereby, a handover is prevented while preventing the processing load on the mobile station device.

7 Claims, 16 Drawing Sheets

WIRELESS COMMUNICATION SYSTEM AND HANDOVER METHOD

TECHNICAL FIELD

The present invention relates to a wireless communication system and a handover method.

Priority is claimed on Japanese Patent Application No. 2009-195710, filed Aug. 26, 2009, the content of which is incorporated herein by reference.

BACKGROUND ART

Regarding a wireless communication system providing services for CSG (Closed Subscriber Group) cells, the area of service provided by a micro base station for a CSG cell is smaller than the area of service provided by a macrocell base station. For this reason, if a mobile terminal in communication continues to move, and even if the mobile terminal once accesses the micro base station for the CSG cell, the mobile terminal moves out of the area of the service provided by the micro base station in no time, and therefore performs a handover from the micro base station for the CSG cell to the macrocell base station. Thereafter, if the mobile terminal returns to the original place, the mobile terminal performs a handover to the original micro base station for the CSG cell. If the mobile terminal moves to a new place, the mobile terminal performs a handover to a micro base station for a new CSG cell. Thus, it has been known that if the mobile terminal moves, the number of handovers increases compared to a wireless communication system of related art which provides services only for macrocells.

If a mobile terminal moves and frequently performs a handover from a macrocell base station to a microcell micro base station, or from a microcell micro base station to a macrocell base station, the amount of control data communicated between the mobile terminal and the base station increases, thereby causing a decrease in the amount of user data and therefore causing a reduction in throughput. Other than that, if a handover is repeatedly performed, a network exchanger has a heavy load to manage the positions of mobile terminals, thereby increasing the load of communication networks. For this reason, to prevent a handover from being frequently performed, there has been the following methods.

Patent Document 1 discloses a method for a mobile terminal to limit handover operation based on the remaining amount of a battery of the mobile terminal. Patent Document 2 discloses a method for a mobile terminal to detect the moving speed thereof, stop to perform a handover according to the speed, and access a macrocell.

Here, a CSG (Closed Subscriber Group) cell means a cell among microcells, which only specific users are allowed to access.

CITATION LIST

Patent Document

[Patent Document 1] Japanese Unexamined Patent Application, First Publication No. 2007-97122
[Patent Document 2] Japanese Unexamined Patent Application, First Publication No. H09-51571

DISCLOSURE OF THE INVENTION

Problems to be Solved by the Invention

However, in the aforementioned method of the related art, a handover is prevented by control on the side of the mobile terminal (mobile station device). For this reason, for example, states of peripheral cells have to be checked by peripheral monitoring. Thus, there is a problem in that the processing load on the mobile station device increases.

The present invention has been made in view of the above situations. An object of the present invention is to provide a wireless communication system and a wireless communication method which can prevent a handover while preventing an increase in the processing load on a mobile station device.

Means for Solving the Problems (1) The present invention has been made to solve the above problems. A wireless communication system of the present invention includes: a macrocell base station device; a micro base station device serving a cell having a region including at least a part of a region of a cell served by the macrocell base station device; and a mobile station device. One of the macrocell base station device and the micro base station device includes a reporter configured to report, to the mobile station device, micro base station information indicating the micro base station device to which the mobile station device can perform a handover. The mobile station device includes a handover destination selector configured to select a handover destination based on the micro base station information reported.

(2) Regarding the wireless communication system according to the present invention, one of the macrocell base station device and the micro base station device includes: a communication state detector configured to detect a state of communication between the mobile station device and the base station device; a handover determining unit configured to determine, based on a result of detection by the communication state detector, whether handover to the micro base station is available. The reporter is configured to generate and report the micro base station information based on a result of determination by the handover determining unit.

(3) Regarding the wireless communication system according to the present invention, the communication state detector included in the macrocell base station device is configured to detect a frequency at which the mobile station device performs a handover.

(4) Regarding the wireless communication system according to the present invention, the communication state detector is configured to detect, for each of the micro base station devices, a frequency at which the mobile station device performs a handover to the micro base station device. The handover detector included in the macrocell base station device is configured to determine, based on a result of detection of the frequency of the handover, whether or not a handover to each of the micro base station devices is available.

(5) Regarding the wireless communication system according to the present invention, the micro base station device includes the communication state detector and the handover determining unit. The communication state detector is configured to detect a frequency at which the mobile station device performs a handover to the micro base station device. The macrocell base station device includes the reporter. The reporter is configured to generate and report the micro base station information based on the result of the detection.

(6) Regarding the wireless communication system according to the present invention, the micro base station device includes the communication state detector and the handover determining unit. The communication state detector is configured to detect a transmission power of a signal transmitted by the mobile station device. The macrocell base station device includes the reporter. The reporter is configured to generate and report the micro base station information based on the result of the detection.

(7) Regarding the wireless communication system according to the present invention, the micro base station device includes the communication state detector and the handover determining unit. The communication state detector is configured to detect a transmission power when the mobile station device transmits a signal. The macrocell base station device includes the reporter. The reporter is configured to generate and report the micro base station information based on the result of the detection.

(8) Regarding the wireless communication system according to the present invention, the reporter is configured to generate and report, if a predetermined duration elapses from the time the micro base station information is generated and reported, micro base station information indicating that a handover to the micro base station device is available, regardless of the result of the detection.

(9) The wireless communication system according to the present invention further includes a plurality of micro base station devices. Each of the micro base station devices includes the reporter, the communication state detector, and the handover determining unit.

(10) A handover method of the present invention is a handover method for a wireless communication system including: a macrocell base station device; a micro base station device serving a cell having a region including at least a part of a region of a cell served by the macrocell base station device; and a mobile station device. The handover method includes: a first step of one of the macrocell base station device and the micro base station device reporting, to the mobile station device, micro base station information indicating the micro base station device to which the mobile station device can perform a handover, and a second step of the mobile station device selecting a handover destination based on the micro base station information reported.

Effects of the Invention

According to the present invention, the communication unit of the macrocell base station device or the micro base station device reports to the mobile station device, the micro base station information indicating a micro base station device to which the mobile station device can perform a handover. The handover destination selector of the mobile station device selects a handover destination based on the reported micro base station information, thereby enabling prevention of a handover while preventing an increase in the processing load on the mobile station device.

BEST MODE FOR CARRYING OUT THE INVENTION

First Embodiment

Figure 1:
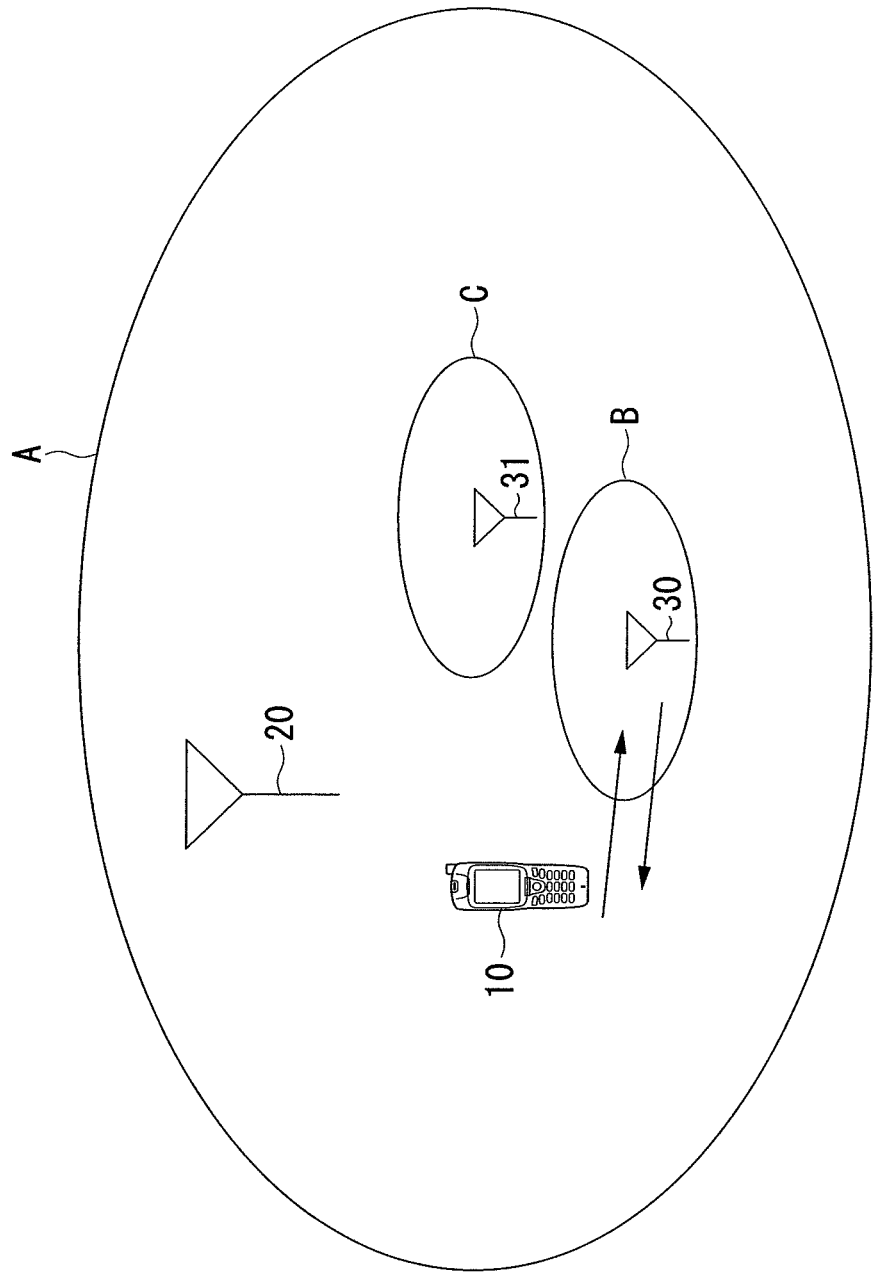
FIG. 1 is a conceptual diagram illustrating a configuration of a wireless communication system 1 according to a first embodiment of the present invention.

Hereinafter, a first embodiment of the present invention is explained with reference to the drawings. FIG. 1 is a conceptual diagram illustrating a configuration of a wireless communication system 1 according to the first embodiment of the present invention. As shown in FIG. 1, the wireless communication system 1 according to the first embodiment includes: a mobile station device 10; a macrocell base station device 20 providing broadband services; and micro base station devices 30 and 31.

In FIG. 1, the area in which the macrocell base station device 20 provides services is regarded as a macrocell A. Additionally, part of the area of the macrocell A is regarded as a CSG cell B that is the area in which the micro base station device 30 provides services. Similarly, part of the area of the macrocell A is regarded as a CSG cell C that is the area in which the micro base station device 31 provides services.

If the micro base station device 30 properly operates in the service area of the macrocell base station device 20 (macrocell A), the macrocell base station device 20, which is a base station for the macro cell A, includes information of the CSG cell B in CSG information to be reported to the mobile station device 10, and reports the CSG information. The information of the CSG cell B is also information of the micro base station device 30 providing the service area of the CSG cell B. The mobile station device 10 stores the received CSG information.

Additionally, the macrocell base station device 20 has a function for measuring two types of duration, which are a timer A and a timer B. The timer A starts to operate upon detecting a handover and stops after a given duration TA. The macrocell base station device 20 counts the number of handovers performed by a mobile terminal while the timer A operates. The timer B counts a duration TB from the time new changed CSG information is reported to the time the CSG information is restored to the original CSG information. A value of the duration TA for which the number of handovers is measured and a value of the duration 1B until the CSG information is restored to the original CSG information are stored by the macrocell base station device 20, and can be changed according to the state of a network or operation of the mobile terminal.

Figure 2:
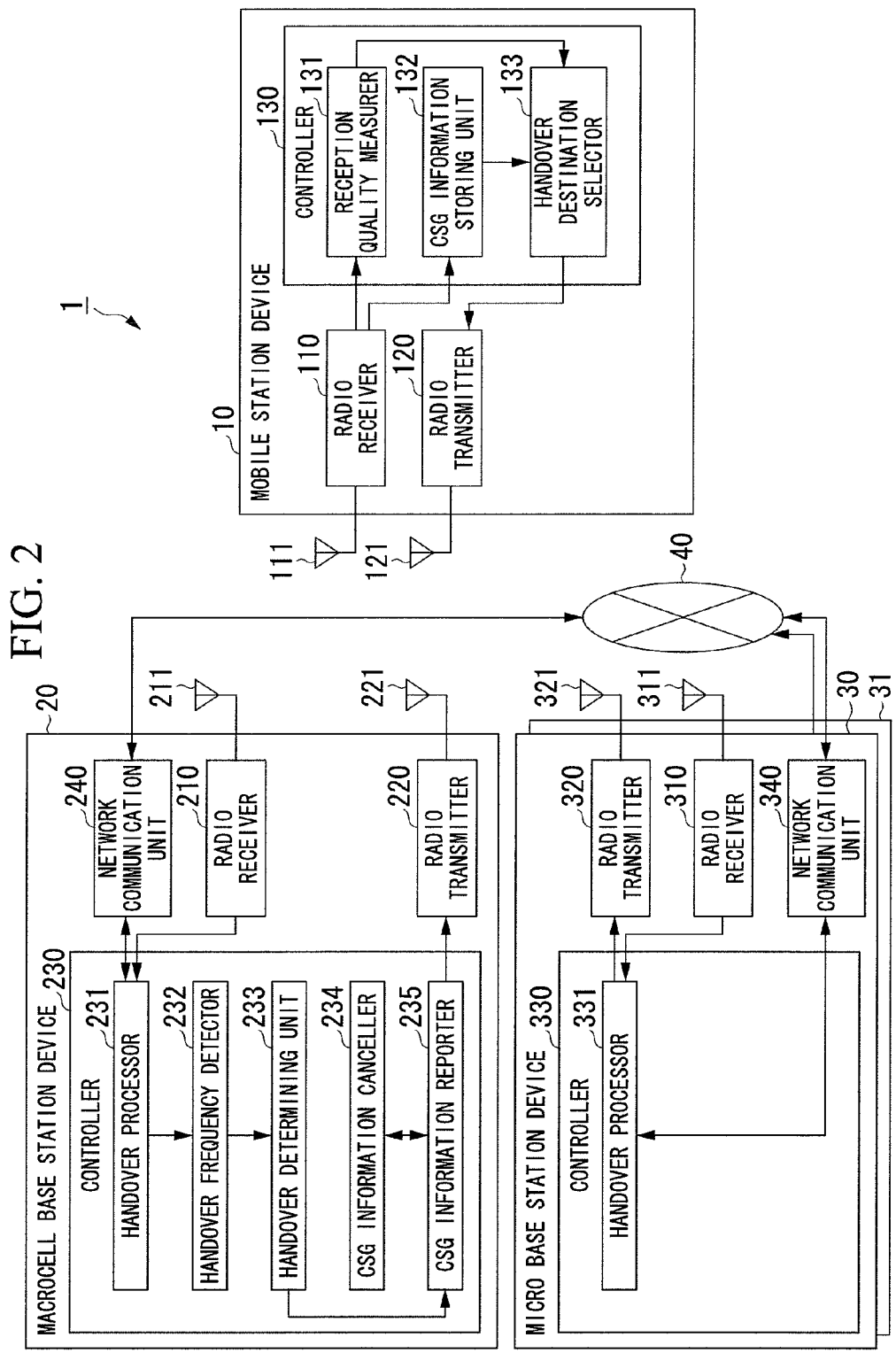
FIG. 2 is a schematic block diagram illustrating the configuration of the wireless communication system 1 according to the first embodiment.

FIG. 2 is a schematic block diagram illustrating a configuration of the wireless communication system 1 according to the first embodiment. The wireless communication system 1 includes: the mobile station device 10; the macrocell base station device 20; and the micro base station devices 30 and 31. The macrocell base station device 20 and the micro base station devices 30 and 31 are connected to one another via a network 40 so as to be able to communicate with one another. The mobile station device 10 includes: a radio receiver 110; a reception antenna 111; a radio transmitter 120; a transmission antenna 121; and a controller 130. The controller 130 includes: a reception quality measurer 131; a CSG information storing unit 132; and a handover destination selector 133.

The macrocell base station device 20 includes: a radio receiver 210; a reception antenna 211; a radio transmitter 220; a transmission antenna 221; a controller 230; and a network communication unit 240. The controller 230 includes: a handover processor 231; a handover frequency detector 232; a handover determining unit 233; a CSG information canceller 234; and a CSG information reporter 235. Each of the micro base station device 30 and the micro base station device 31 has the same configuration, and includes: a radio receiver 310; a reception antenna 311; a radio transmitter 320; a transmission antenna 321; a controller 330; and a network communication unit 340. The controller 330 includes a handover processor 331.

The radio receiver 110 of the mobile station device 10 receives, through the reception antenna 111, a radio signal transmitted by the macrocell base station device 20 or the micro base station devices 30 and 31. The radio receiver 110 demodulates the received signal and outputs the demodulated signal to the controller 130. The radio transmitter 120 modulates the data received from the controller 130, and transmits the modulated data to the macro base station device 20 or the micro base station devices 30 and 31 through the radio antenna 121.

Upon receiving the data from the radio receiver 110, the controller 130 generates data according to the received data, and data to be transmitted to the macrocell base station device 20 or the micro base station device 30, and outputs the generated data to the radio transmitter 120. The reception quality measurer 131 of the controller 130 measures a reception quality of the signal for each cell which is received by the radio receiver 110 through the reception antenna 111. The reception quality measurer 131 obtains, from the radio receiver 110, a signal required for measuring reception quality. As the reception quality, the signal to noise ratio or the signal to interference noise ratio may be used. Alternatively, the reception power such as the RSRP (Reference Signal Receive Power), or a pathloss indicating propagation loss may be used.

The CSG information storing unit 132 stores CSG information which is reported from the macrocell base station device 20 and received and demodulated by the radio receiver 110. The handover destination selector 133 selects a handover destination based on the reported CSG information and the reception quality for each cell which is measured by the reception quality measurer 131. Here, the CSG information (micro base station information) includes information indicating a micro base station device to be a candidate for the handover destination of the mobile station device 10 to which the CSG information is reported.

The radio receiver 210 of the macrocell base station device 20 receives, through the reception antenna 211, the radio signal transmitted by the mobile station device 10. The radio receiver 210 outputs, to the controller 230, the data obtained by demodulating the received signal. The radio transmitter 220 modulates the data received from the controller 230, and transmits the modulated data to the mobile station device 10 through the radio antenna 221. Upon receiving the data from the radio receiver 210, the controller 230 generates data according to the received data, and data to be transmitted to the mobile station device 10, and outputs the generated data to the radio transmitter 220. The network communication unit 240 communicates with the micro base station devices 30 and 31 through the network 40. Additionally, the communication unit 240 receives, from the network 40, data addressed to the mobile station device 10, and outputs the received data to the controller 230.

When the radio receiver 210 receives, from the mobile station device 10, an instruction for performing a handover, the handover processor 231 communicates, through the network communication unit 240, the micro base station device specified by the instruction as the handover destination, and performs a handover. Additionally, when the network communication unit 240 receives, from the micro base station devices 30 and 31, an instruction for performing a handover, the handover processor 231 performs a handover of the mobile station device 10 specified by the instruction.

The handover frequency detector 232 is a communication state detector of the first embodiment which detects the communication state between the mobile station device 10 and the macrocell base station device 20. In the first embodiment, the handover frequency detector 232 counts the number of handovers to respective micro base station devices which are performed by the handover processor 231 of the mobile station device 10, for a duration from the initial handover until the timer A ends (duration TA), thereby detecting a frequency at which the mobile station device 10 performs a handover. Based on a result of the detection by the handover frequency detector 232, the handover determining unit 233 determines whether or not handovers to the micro base station devices 30 and 31 are available. Specifically, every time the handover frequency detector 232 detects a handover, the handover determining unit 233 compares the number detected from the time the timer A starts to a predetermined threshold (given number). If the detected number exceeds the threshold, the handover determining unit 233 determines that the handover to that micro base station device is unavailable.

The CSG information reporter 235 (reporter) generates CSG information according to a result of the determination by the handover determining unit 233, and reports the generated CSG information to the mobile station device 10. In other words, the CSG information reporter 235 generates CSG information including a list that is information indicating micro base station devices other than the micro base station device for which it is determined that a handover is unavailable as a result of the determination by the handover determining unit 233. Then, the CSG information reporter 235 transmits the generated CSG information to the mobile station device 10 through the radio transmitter 220.

If a predetermined duration (duration TB) elapses from the time the CSG information reporter 235 generates the CSG information according to the result of the determination by the handover determining unit 233 and reports the CSG information, the CSG information canceller 234 generates CSG information indicating that a handover to the micro base station is available, regardless of the result of the determination, and causes the CSG information reporter 235 to report the generated CSG information.

Here, the aforementioned handover frequency detector 232 detects the frequency for each micro base station device. However, the handover frequency detector 232 may detect a frequency at which a handover is performed regardless of the micro base station device. In this case, the handover determining unit 233 does not determine availability or unavailability of handover for each micro base station device, but determines availability or unavailability of handover for each mobile station device 10. The CSG information reporter 235 generates and reports CSG information indicating that all the micro base station devices are available for handover or that all the micro base station device are unavailable for handover.

The radio receiver 310 of each of the micro base station devices 30 and 31 receives, through the reception antenna 311, the radio signal transmitted by the mobile station device 10. The radio receiver 310 outputs, to the controller 330, data obtained by demodulating the received signal. The radio transmitter 320 modulates the data received from the controller 330 and transmits the modulated data to the mobile station device 10 through the radio antenna 321. Upon receiving the data from the radio receiver 310, the controller 330 generates data according to the received data, and data to be transmitted to the mobile station device 10, and outputs the generated data to the radio transmitter 320. Through the network 40, the network communication unit 340 communicates with the macrocell base station device 20 and a micro base station device other than the macrocell base station device 20. Additionally, the network communication unit 340 receives from the network 40 data addressed to the mobile station device 10 and outputs the received data to the controller 330.

When the radio receiver 310 receives from the mobile station device 10 an instruction for performing a handover, the handover processor 331 communicates, through the network communication unit 340, with the micro base station device specified by the instruction as the handover destination, and performs a handover. Additionally, when the network communication unit 240 receives an instruction for performing a handover from the macrocell base station device 20 or the micro base station devices 30 and 31, the handover processor 331 performs a handover of the mobile station device 10 specified by the instruction.

Figure 3:
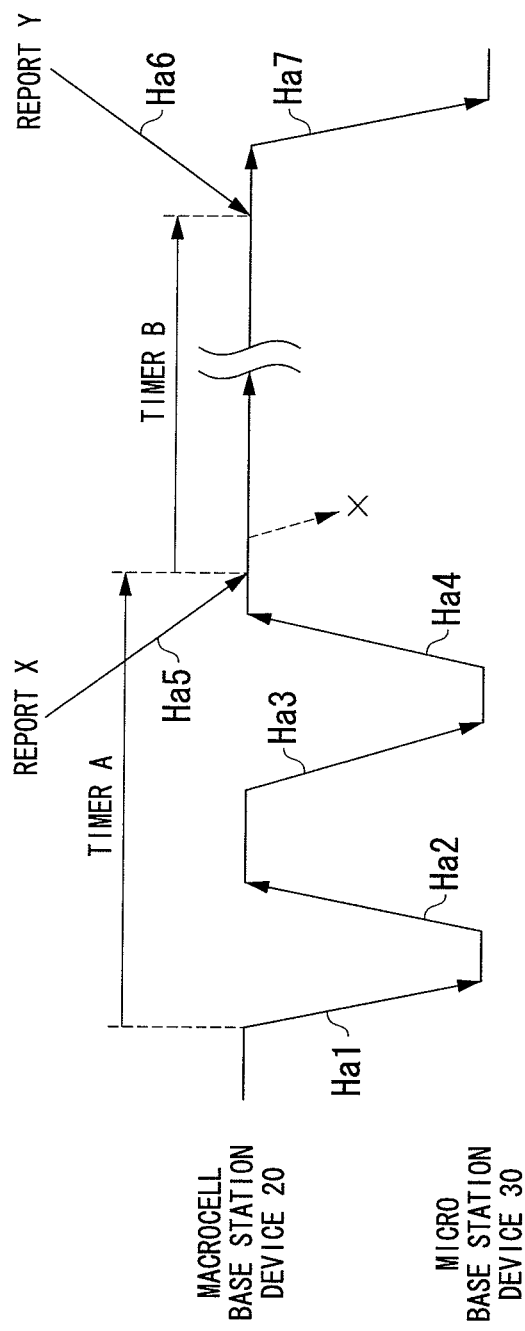
FIG. 3 is a diagram illustrating a serving state while a mobile station device 10 moves between a macrocell A and a CSG cell B according to the first embodiment.

FIG. 3 is a diagram illustrating an example of a serving state while the mobile station device 10 moves between the macrocell A and the CSG cell B according to the first embodiment. In the case of FIG. 3, the mobile station device 10 in communication with the macrocell base station device 20 moves in the service area of the macrocell A, and moves to the service area of the CSG cell B. In this case, if the mobile station device 10 searches peripheral base station devices and finds a micro base station device 30 (CSG cell B), the mobile station device 10 confirms whether or not information of the CSG cell B as a handover target is included in the CSG information stored by the CSG information storing unit 132. If the information of the CSG cell B is included in the CSG information stored by the CSG information storing unit 132 of the mobile station device 10, the mobile station device 10 performs a handover from the macrocell base station device 20 to the micro base station device 30 (Ha1).

At this time, the handover frequency detector 232 of the macrocell base station device 20 knows that the mobile station device 10 has performed the handover to the micro base station device 30, counts that the first handover has occurred, and initiates operation of the timer A.

Then, if the mobile station device 10 moves out of the service area of the micro base station device 30 and performs a handover again to the macrocell base station device 20 for the macrocell A within a given duration (Ha2), the handover frequency detector 232 of the macrocell base station device 20 recognizes that the second handover has occurred.

The mobile station device 10 moves again and performs the third handover to the micro base station device 20 for the CSG cell B (Ha3).

Further, the mobile station device 10 moves out of the service area of the micro base statin device 20 and performs the fourth handover (Ha4). Thus, handovers are continuously performed by the mobile station device 10 repeatedly moving in and out of the area of the CSG cell B in which the micro base station device 30 provides services.

Here, if the handover determining unit 233 of the macrocell base station device 20 determines, while the timer A is in operation, that the mobile station device 10 is in the state of repeatedly performing a handover, the CSG information reporter 235 reports, to the mobile station device 10, new CSG information from which the information of the CSG cell B is deleted, instead of the previous CSG information including the information of the CSG cell B (Ha5). The CSG information to be reported here corresponds to a report X of the new CSG information which is shown in FIG. 3. The new CSG information may be reported only to the mobile station device 10, as an individual signal addressed to the mobile station device 10. Alternatively, the new CSG information may be reported to multiple mobile station devices, as a common signal addressed to mobile station devices present in the macrocell A.

Regarding the macrocell base station device 20, upon receiving the report of the CSG information, the timer A stops operating, and the time B of the CSG information canceller 234 newly starts to operate. Explanation of the timer B will be given later.

The mobile station device 10 receives the new CSG information not including the information of the CSG cell B, and updates the CSG information stored by the CSG information storing unit 132. Then, even if the mobile station device 10 moves to the CSG cell B, searches peripheral base station devices, and finds a micro base station device 30, the information of the CSG cell B is not included in the CSG information stored by the CSG information storing unit 132 of the mobile station device 10. For this reason, the handover destination selector 133 does not perform operation of a handover to the micro base station device 30, and enters the state of being kept connected to the macrocell base station device 20.

If specific CSG information is described here, the CSG information storing unit 132 of the mobile station device 10 stores, before the handover (Ha1) is performed, information (CSG_b, CSG_c, CSG_d, . . . ) as CSG information. The report X of the new CSG information, which is reported after a handover has been performed four times (Ha5), is (CSG_c, CSG_d, . . . ), from which it is understood that CSG_b has been deleted. The mobile station device 10 receives the CSG information, and updates the previous CSG information stored by the CSG information storing unit 132. Thereby, the CSG information storing unit 132 stores the new CSG information. Thus, the report X of the new CSG information does not include the information of the CSG cell B to be a handover target. For this reason, the handover destination selector 133 does not select the micro base station device 30 as a handover destination.

By the above control, the mobile station device 10 is subjected to the operational limitation of continuous handovers between the macrocell base station device 20 and the micro base station device 30 for the CSG cell B.

As explained above, the number of handovers is counted for a given duration, that is, while the mobile station device 10 is in communication with the macrocell base station device 20 and the timer A operates. If the number of handovers exceeds the given number, information of the CSG cell to be a handover destination is deleted from the CSG information reported from the macrocell base station device 20. Accordingly, the mobile station device 10, which selects a handover destination based on the CSG information, does not perform monitoring operation on the CSG cell, thereby preventing a handover of the mobile station device 10 while preventing an increase in the processing load on the mobile station device 10.

In the first embodiment, the given number of handovers is set to be four, and the information of the CSG cell B to be a handover target is deleted after the fourth handover occurs. However, the given number of handovers may be changed according to the number of mobile terminals present in a macrocell, the number of CSG cells in a macrocell, or the like. For example, if the number of mobile station devices 10 present in a macrocell is small, the macrocell base station device 20 can decrease the number of control processes required for managing the mobile station devices 10. Thereby, even if a handover occurs, load on a communication network is expected to be light. For this reason, the given number of that handover can be increased. On the other hand, if the number of mobile station devices 10 present in a macrocell is large, there is a possibility that the greater number of mobile station devices will repeatedly perform a handover, and therefore the greater number of control processes will be required for the handover process. For this reason, the given number of handovers is set to be small to decrease the load on a communication network.

It has been explained above with reference to FIG. 3 that the CSG information from which the information of the CSG cell B is deleted is reported (Ha5), thereby limiting a handover. Hereinafter, explanation is given with respect to a case in which the CSG information is restored, after a given duration elapses from the time a handover is limited, to the original CSG information so as to include the information of the CSG cell B, and the restored CSG information is reported to the mobile station device 10.

The mobile station device 10, which stops such operation as repetitive handover by updating the CSG information to the new CSG information, is in communication with the macrocell base station device 20. Regarding the CSG information canceller 234 of the macrocell base station device 20, the timer B is in operation.

When the timer B counts the given duration TB, the CSG information canceller 234 of the macrocell base station device 20 generates CSG information including the information of the CSG cell B which is deleted in the report X. Then, the CSG information canceller 234 causes the CSG information reporter 235 to report the generated CSG information to the mobile station device 20 (Ha6). In other words, the CSG information canceller 234 transmits a report Y of the CSG information for restoration. The mobile station device 10 receives new CSG information, and the controller 130 thereof updates the CSG information stored by the CSG information storing unit 132 to the received CSG information.

The mobile station device 10 in communication, which is present in the service area of the CSG cell B and has received the new CSG information including the information of the CSG cell B, has the information of the CSG cell B (micro base station device 30) as a handover destination. For this reason, the mobile station device 10 can perform operation of a handover from the macrocell base station device 20 to the micro base station device 30 (Ha7). Thus, the macrocell base station device 20 deletes or adds information related to the CSG cell which the mobile station device 10 has, and thereby controls handover operation of the mobile station device 10.

The given duration TB for restoring the CSG information, that is, the operational duration of the timer B is approximately 3 or 5 minutes, depends on macrocells or networks, and the duration for restoring the CSG information varies according to states of macrocells in some cases.

Figure 4:
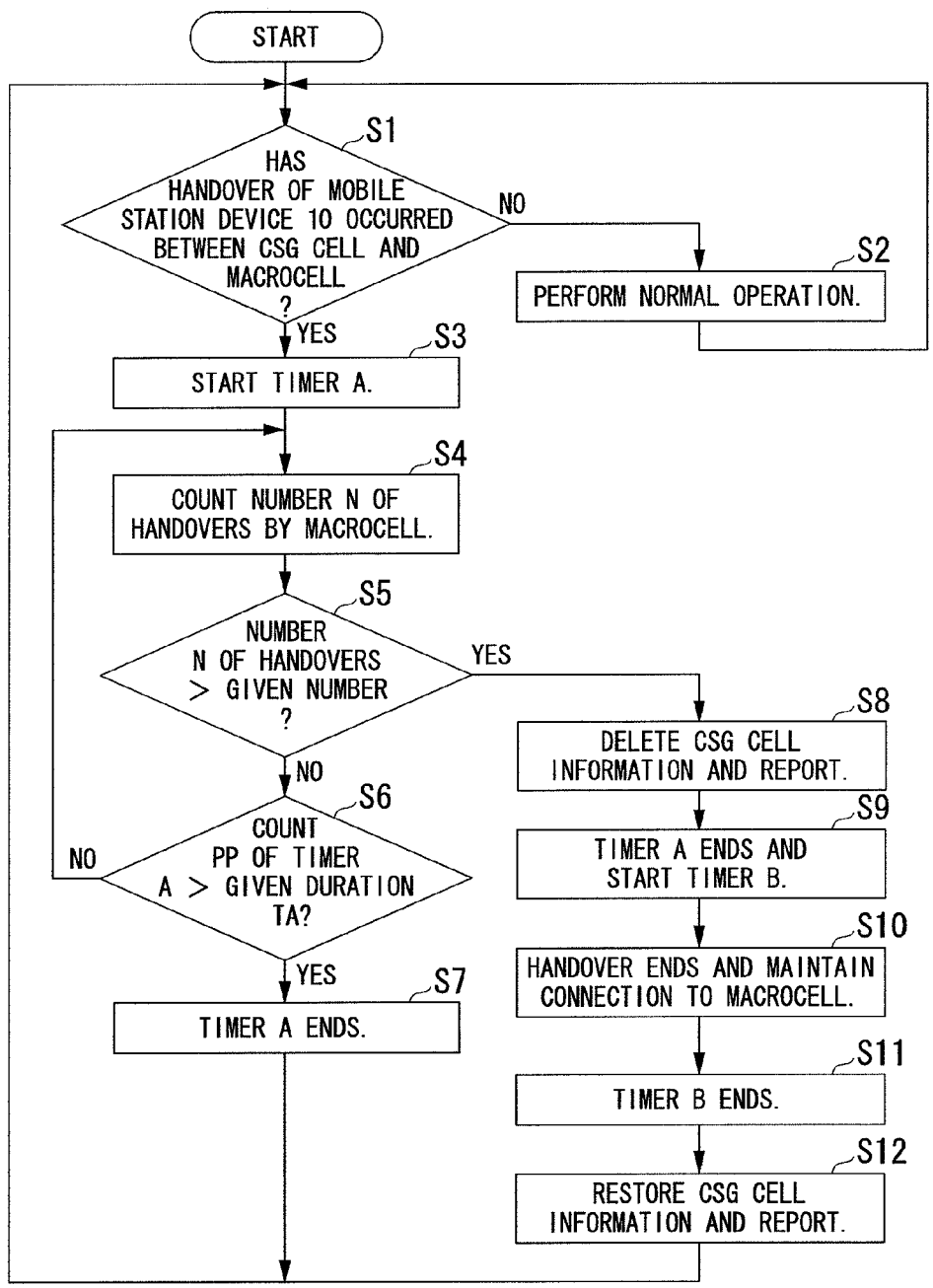
FIG. 4 is a flowchart illustrating operations by a macrocell base station device 20 according to the first embodiment.

FIG. 4 is a flowchart illustrating operations by the macrocell base station device 20 according to the first embodiment. Firstly, the handover processor 231 of the macrocell base station device 20 waits until a handover of the mobile station device 10 occurs between a CSG cell and a macrocell (S1: NO). If a handover occurs (S1: YES), the handover processor 231 causes the handover frequency detector 232 to start the timer A (S3). The handover frequency detector 232 of the macrocell base station device 20 counts the number N of handovers performed by the mobile station device 10 (S4). The handover determining unit 233 determines whether or not the number N of handovers exceeds a given number that is a predetermined threshold (S5). If it is determined that the number N does not exceed the given number (S5: NO), the handover frequency detector 232 determines whether nor not the duration counted by the timer A exceeds the predetermined given duration TA (S6). If it is determined that the counted duration exceeds the given duration TA (S6: YES), the handover frequency detector 232 stops the timer A, and returns to step S1.

Meanwhile, if it is determined in step S5 that the number N of handovers exceeds the given number (S5: YES), the CSG information reporter 235 deletes, from the CSG information, information of the micro base station device 30 that is the handover destination of the mobile station device 10. Then, the CSG information reporter 235 reports the CSG information to the mobile station device 10 through the radio transmitter 220 (S8). Then, the handover frequency detector 232 stops the timer A, and the CSG information canceller 234 starts the timer B (S9). The mobile station device 10 stores, in the CSG information storing unit 132, the CSG information from which the information of the micro base station device 30 has been deleted. Based on the CSG information, the mobile station device 10 selects a handover destination. For this reason, the mobile station device 10 prevents a handover from occurring, and thereby maintains the connection to the macrocell base station device 20 for the macrocell A (S10).

If time passes, and the duration counted by the timer B becomes the predetermined given duration TB, the timer B ends (S11). The CSG information canceller 234 restores the CSG information from which the information of the micro base station device 30 has been deleted in step S8 to the original CSG information. Then, the CSG information canceller 234 causes the CSG information reporter 235 to report the restored CSG information to the mobile station device 10, and returns to step S1.

Second Embodiment

Figure 5:
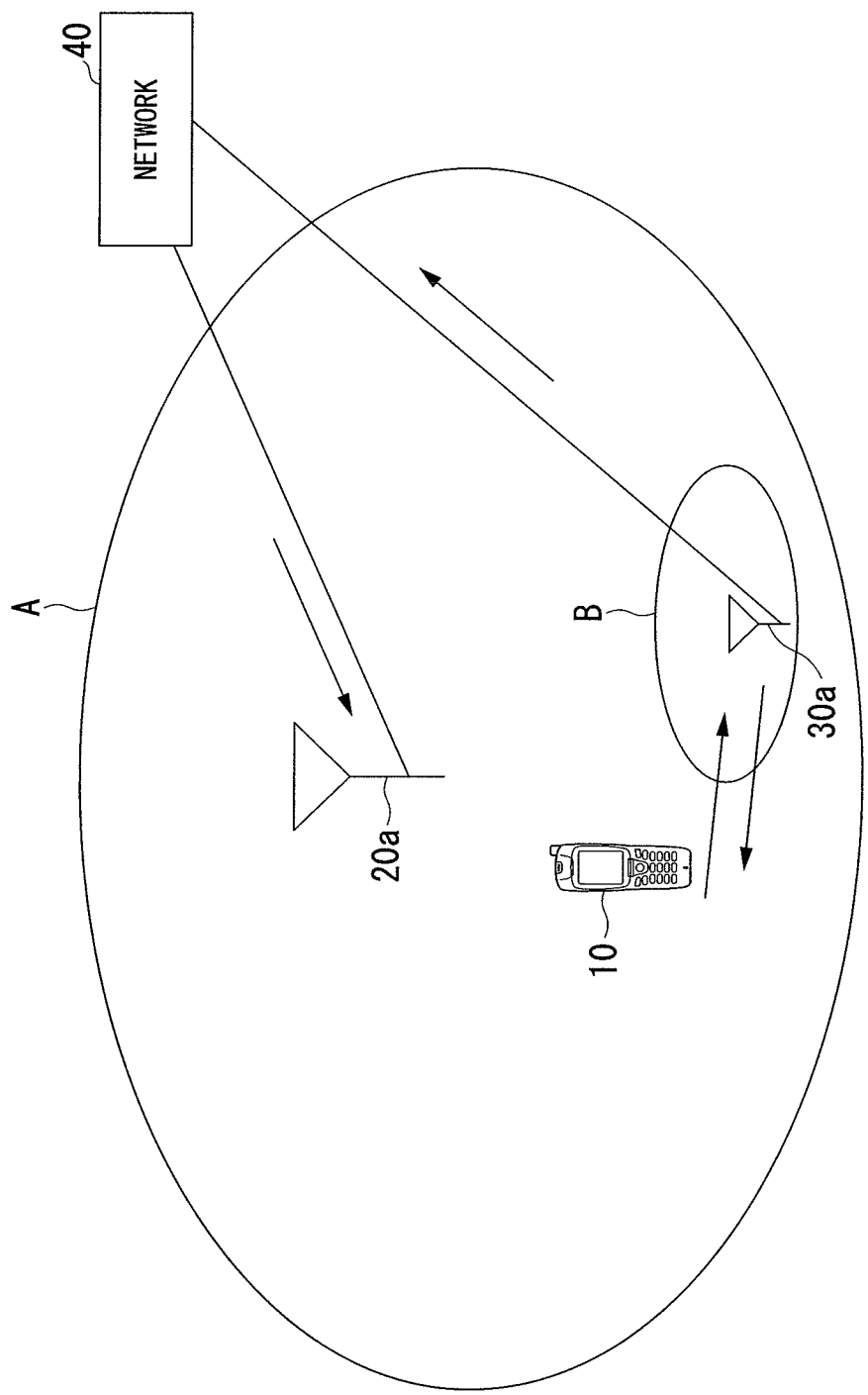
FIG. 5 is a diagram illustrating a state of cell arrangement for a wireless communication system 1a according to a second embodiment of the present invention.

In the first embodiment, the number of handovers is measured by the macrocell base station device 20. In a second embodiment, a micro base station device 30a for a CSG cell counts the number of handovers, and reports handover number information to a macrocell base station device 20a through the network 40 such as a backhaul line, and reflects the handover number information on CSG information reported from the macrocell base station device 20a. Here, the micro base station device 30a for the CSG cell includes a timer C that counts a duration for which the number of handovers is counted. FIG. 5 is a diagram illustrating a state of cell arrangement for a wireless communication system 1a according to the second embodiment. As shown, in the second embodiment, part of the area of the macrocell A that is a cell served by the macrocell base station device 20a is regarded as the CSG cell B that is a cell served by the micro base station device 30a.

Figure 6:
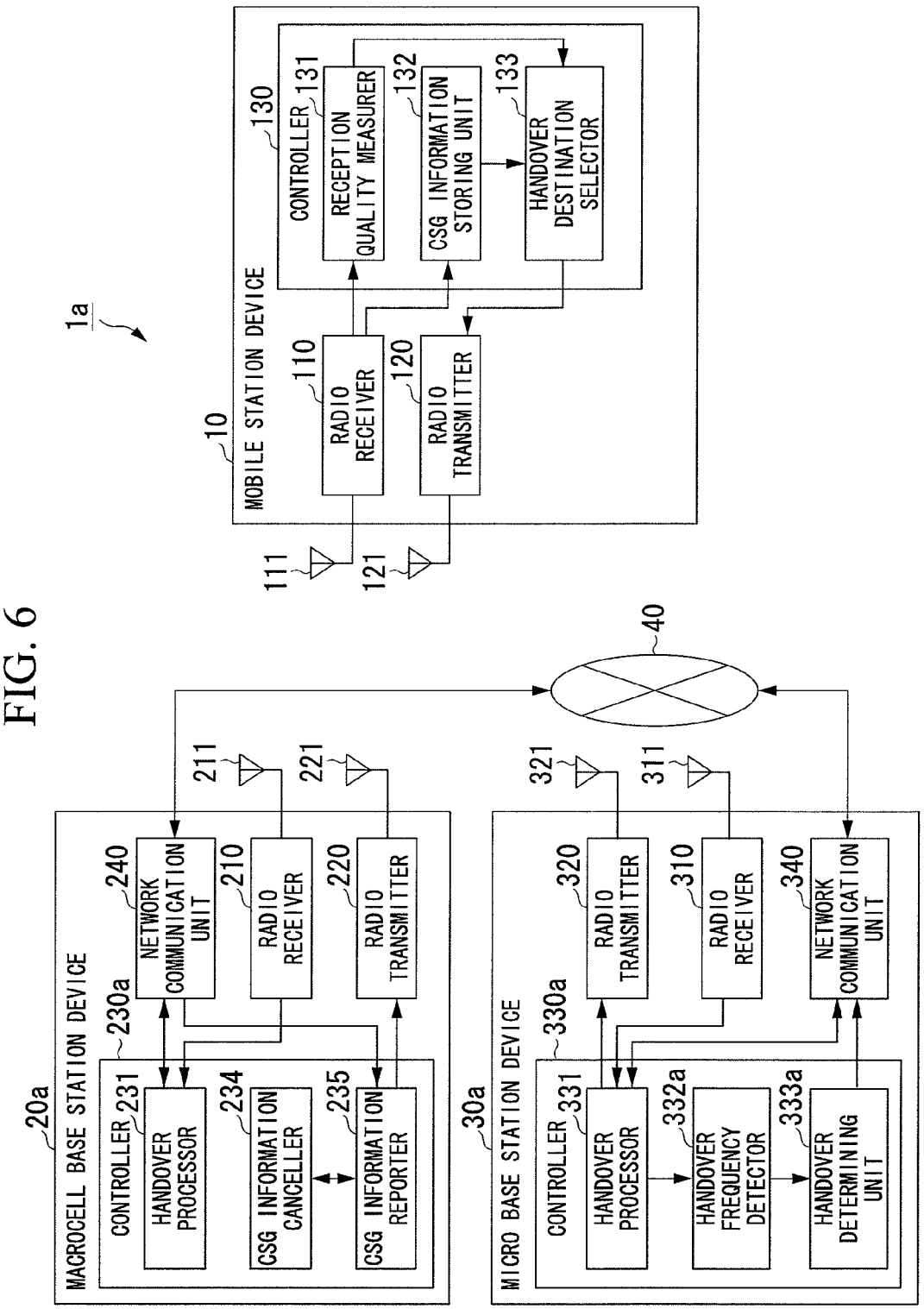
FIG. 6 is a schematic block diagram illustrating a configuration of the wireless communication system 1a according to the second embodiment.

FIG. 6 is a schematic block diagram illustrating a configuration of the wireless communication system 1a according to the second embodiment. The wireless communication system 1a includes: the mobile station device 10; the macrocell base station device 20a; and the micro base station device 30a. Similar to FIG. 2, the mobile station device 10 includes: the radio receiver 110; the reception antenna 111; the radio transmitter 120; the transmission antenna 121; and the controller 130. The controller 130 includes: the reception quality measurer 131; the CSG information storing unit 132; and the handover destination selector 133.

The macrocell base station device 20a includes: the radio receiver 210; the reception antenna 211; the radio transmitter 220; the transmission antenna 221; a controller 230a; and the network communication unit 240. The controller 230a includes: the handover processor 231; the CSG information canceller 234; and the CSG information reporter 235. The micro base station device 30 includes: the radio receiver 310; the reception antenna 311; the radio transmitter 320; the transmission antenna 321; a controller 330a; and the network communication unit 340. The controller 330a includes: the handover processor 331; a handover frequency detector 332a; and a handover determining unit 333a.

The same reference numerals (10, 110 to 133, 210 to 221, and 234 to 240) are appended to elements shown in FIG. 6 corresponding to those shown in FIG. 2, and explanations thereof are omitted here. The handover frequency detector 332a is a communication state detector of the second embodiment which detects a state of communication between the mobile station device 10 and the micro base station device 30a. In the second embodiment, the handover frequency detector 332a counts the number of handovers performed by the handover processor 331 of the mobile station device 10 for a duration from the first handover until the timer C ends (duration TC), thereby detecting a frequency at which the mobile station device 10 performs a handover. Based on a result of the detection by the handover frequency detector 332a, the handover determining unit 333a determines whether or not the mobile station device 10 can performs a handover. Specifically, every time the handover frequency detector 332a detects a handover, the handover determining unit 333a compares the number of handovers detected from the time the timer C starts to a predetermined threshold (given number). If the detected number exceeds the threshold, the handover determining unit 333a determines that a handover is unavailable.

Figure 7:
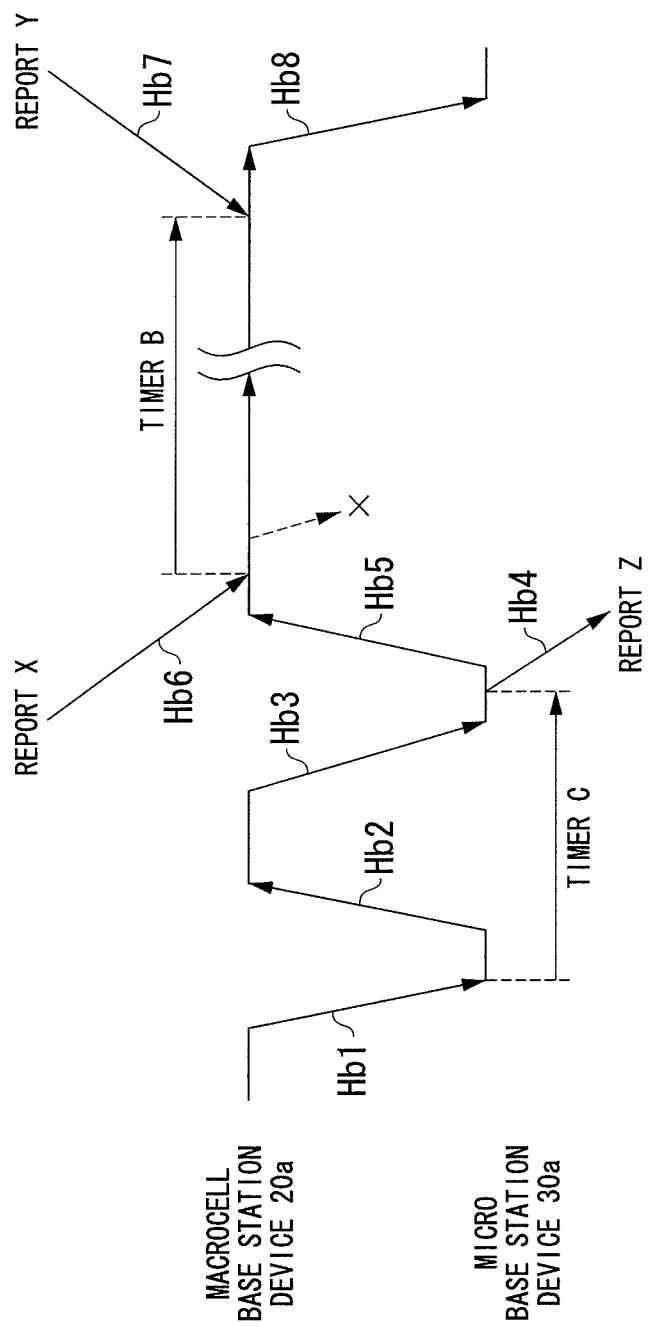
FIG. 7 is a diagram illustrating a serving state while the mobile station device 10 moves between the macrocell A and the CSG cell B according to the second embodiment.

FIG. 7 is a diagram illustrating an example of a serving state while the mobile station device 10 moves between the macrocell A and the CSG cell B according to the second embodiment. If the mobile station device 10 moves to the service area of the CSG cell B while communicating with the macrocell base station device 20a, and if the information of the CSG cell B is included in the CSG information stored by the mobile station device 10, the mobile station device 10 performs a handover to the micro base station device 30a for that CSG cell B (Hb1). At this time, the handover frequency detector 332a of the microcell base station device 20a recognizes that the mobile station device 10 has performed the handover from the service area of a cell other than the CSG cell B to the micro base station device 30a for the CSG cell B, starts the timer A, and counts the number of handovers as one time.

Then, if the mobile station device 10 moves out of the service area of the micro base station device 30a for the CSG cell B (macrocell A), the mobile station device 10 performs a handover to the macrocell base station device 20a (Ha2). The handover frequency detector 332a of the micro base station device 20a recognizes that the second handover has been performed. If the mobile station device 10 moves again to the service area of the micro base station device 20a for the CSG cell B and performs a handover to the micro base station device 20a (Ha3), the handover frequency detector 332a recognizes that the third handover has been performed. At this time, the handover determining unit 333a of the micro base station device 20a determines that a handover is being repeatedly performed while the timer C is in operation for the reason that the number of handovers performed by the mobile station device 10 becomes the given number (3 times), the mobile station device 10 is in motion, and the like. Then, the handover determining unit 333a reports, to the macrocell base station device 20a, a handover number information report Z indicating that the number of handovers becomes the given number of handovers within a given duration, through the network communication unit 340 and the network 40 such as a backhaul line (Hb4). At this time, the timer C of the handover frequency detector 332a stops operating by the handover determining unit 333a transmitting the report Z of the handover number information.

When the macrocell base station device 20a receives from the micro base station device 30a, through the network 40 such as a backhaul line, the report Z indicating that the given number of handovers is exceeded, the CSG information reporter 235 thereof prepares to report new CSG information not including the CSG cell B to the mobile station device 10 through the radio transmitter 220.

Then, if the mobile station device 10 performs the fourth handover to the macrocell base station device 20a (Hb5), the CSG information reporter 235 of the macrocell base station device 20a transmits, through the radio transmitter 220, a report X of the new CSG information not including the information of the CSG cell B (Hb6). Here, upon the CSG information reporter 235 transmitting the report X of the new CSG information, the timer B of the CSG information canceller 234 starts to operate.

Upon the mobile station device 10 receiving the report X of the new CSG information, the controller 130 thereof updates the CSG information stored by the CSG information storing unit 132. Even if the mobile station device 10 moves to the service area of the CSG cell B and tries to perform a handover, the information of the CSG cell B to be a handover target is not included in the CSG information stored by the CSG information storing unit 132. For this reason, the mobile station device 10 cannot perform a handover to the micro base station device 20a for the CSG cell B, and maintains the state of being connected to the macro cell base station device 20a. Thereby, the operation of a handover does not frequently occur within a given duration, and the connection to the macrocell base station device 20a can be maintained. Similar to the first embodiment, the macrocell base station device 20a restores the deleted information of the CSG cell B so as to be included in the CSG information after the given duration TB of the timer B elapses. Then, the macrocell base station device 20a transmits, to the mobile station device 10, a report Y of the CSG information for restoration (Hb7).

In the second embodiment, the report Z of the handover number information is transmitted from the micro base station device 30a to the macrocell base station device 20a through the network 40 such as a backhaul line. However, means for reporting to the macrocell base station device 20a is not limited to the network 40. For example, the report may be wirelessly transmitted directly from the micro base station device toward the macrocell base station device 20a.

Figure 8:
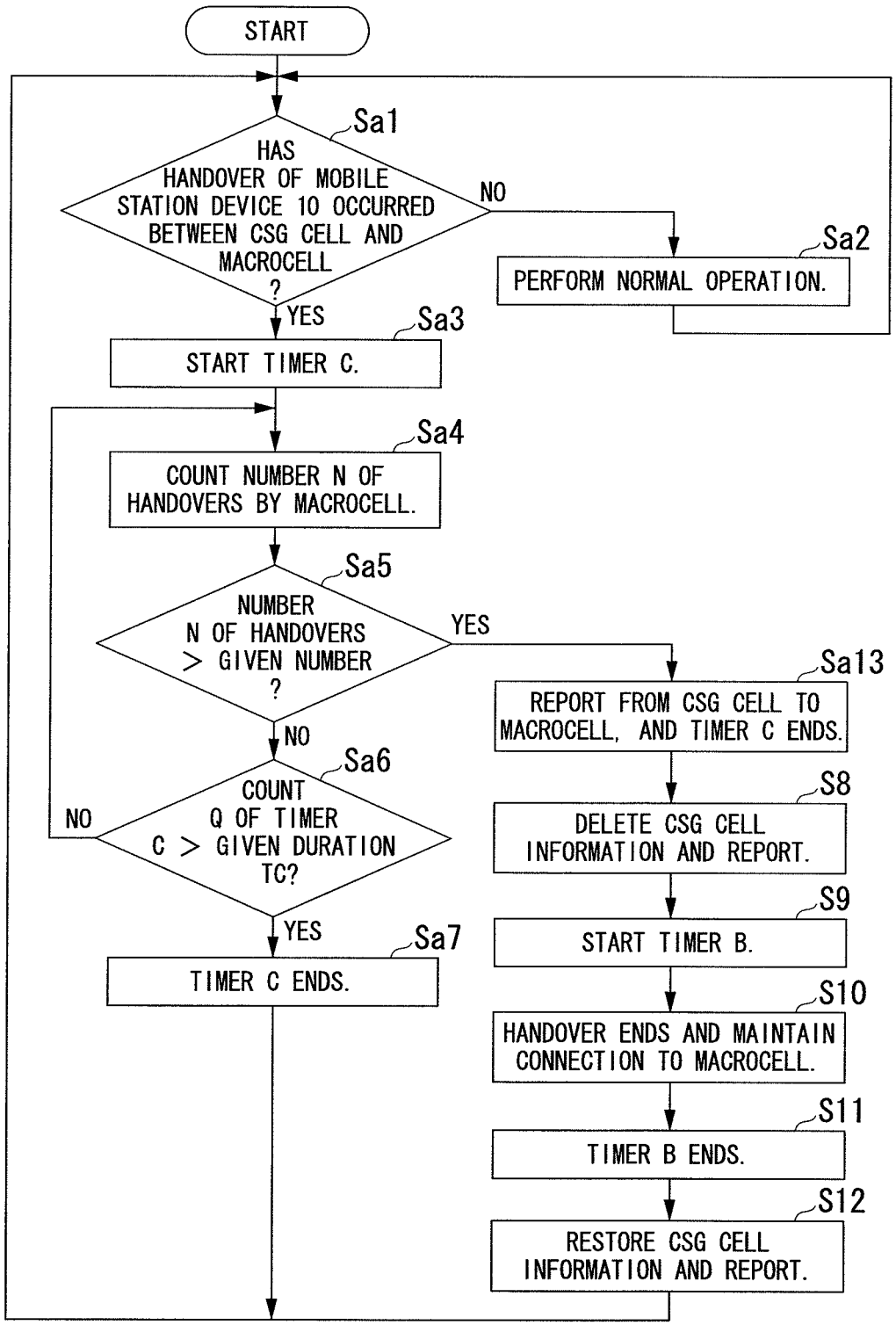
FIG. 8 is a flowchart illustrating operations by a macrocell base station device 20a and a micro base station device 30a according to the second embodiment.

FIG. 8 is a flowchart illustrating operations by the macrocell base station device 20a and the micro base station device 30a according to the second embodiment. In FIG. 8, the same reference symbols (S8 to S12) are appended to steps corresponding to those shown in FIG. 4. Firstly, the handover processor 331 of the microcell base station device 30a waits until a handover of the mobile station device 10 occurs between a CSG cell and a macrocell (Sa1: NO). If a handover occurs (Sa1: YES), the handover processor 331 causes the handover frequency detector 332a to start the timer C (Sa3). The handover frequency detector 332a of the microcell base station device 30a for the CSG cell counts the number of handovers N (Sa4). The handover determining unit 333a determines whether or not the number of handovers N exceeds a given number that is a predetermined threshold (Sa5). If it is determined that the number of handovers N does not exceed the given number (Sa5: NO), the handover frequency detector 332a determines whether nor not the duration counted by the timer C exceeds the predetermined given duration TC (Sa6). If it is determined that the counted duration exceeds the given duration TC (Sa6: YES), the handover frequency detector 332a stops the timer C, and returns to step Sa1.

Additionally, if it is determined in step Sa5 that the given number is exceeded (Sa5: YES), a result of the determination is reported to the macrocell base station device 20a through the network 40 (Sa13), and the timer C is stopped. The CSG information reporter 235 of the macrocell base station device 20a receiving the report deletes from the CSG information, information of the micro base station device 30 that is the reporting source, and reports the CSG information to the mobile station device 10 through the radio transmitter 220 (S8). Then, the CSG information canceller 234 starts the timer B (S9). The mobile station device 10 stores, in the CSG information storing unit 132, the CSG information from which the information of the micro base station device 30 has been deleted. Based on the CSG information, the mobile station device 10 selects a handover destination. For this reason, the mobile station device 10 prevents a handover from occurring, and thereby maintains the connection to the macrocell base station device 20 for the macrocell A (S10).

If time passes, and the duration counted by the timer B becomes the predetermined given duration TB, the timer B ends (S11). The CSG information canceller 234 restores the CSG information from which the information of the micro base station device 30 has been deleted in step S8 to the original CSG information. Then, the CSG information canceller 234 causes the CSG information reporter 235 to report the restored CSG information to the mobile station device 10, and returns to step Sa1.

Third Embodiment

In the third embodiment, where the mobile station device 10 performs a handover between the macrocell base station device 20a and a micro base station device 30b for a CSG cell (Closed Subscriber Group) disposed in the macro cell, the mobile station device 10 reports, as reception level information, the reception level measured by the micro base station device 30b for the CSG cell to the macrocell base station device 20a through the network 40 such as a backhaul line, and thereby reflects the reception level information on CSG information to be reported from the macrocell base station device 20a.

Figure 9:
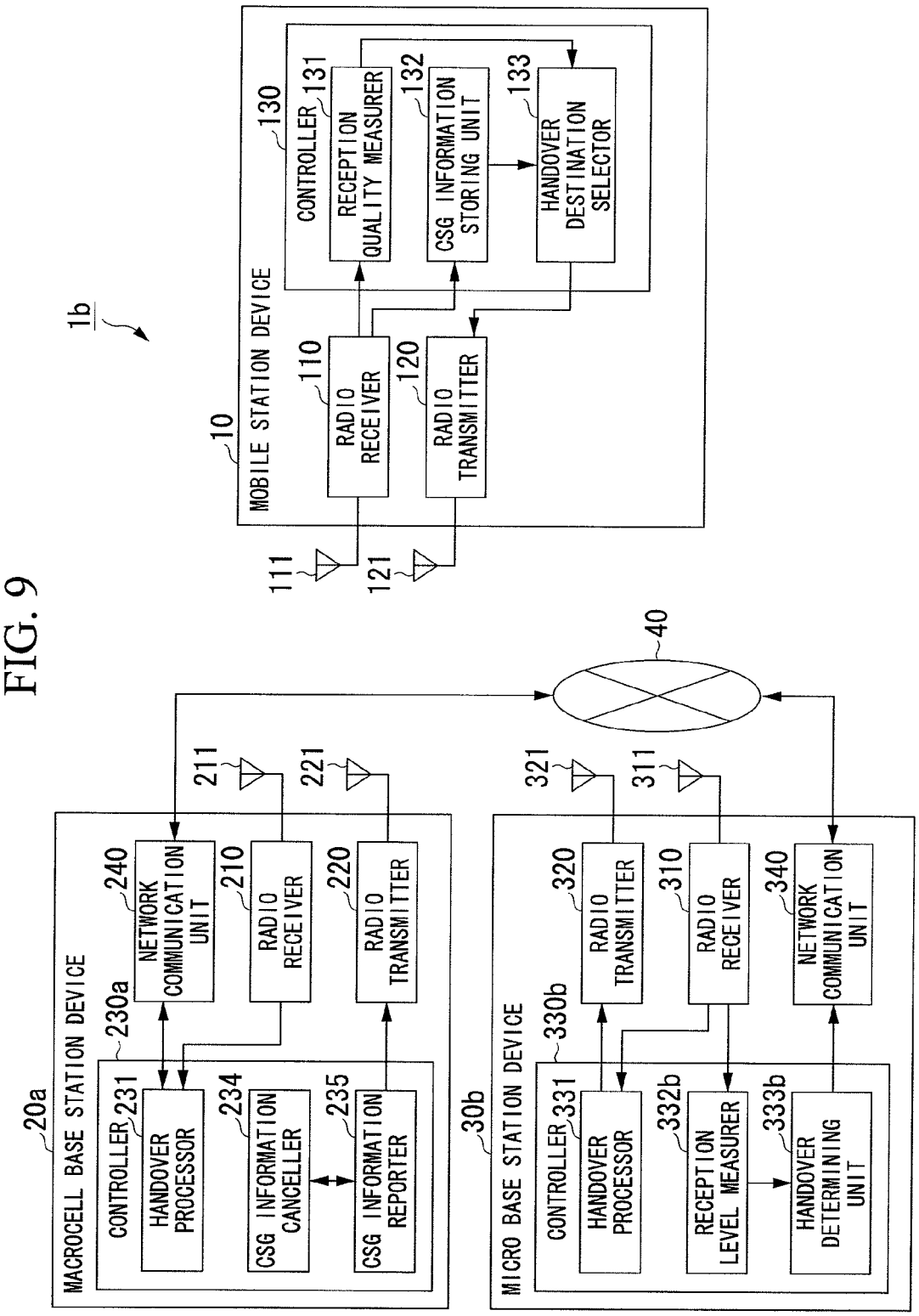
FIG. 9 is a schematic block diagram illustrating a configuration of a wireless communication system 1b according to a third embodiment of the present invention.

FIG. 9 is a schematic block diagram illustrating a configuration of a wireless communication system 1b according to the third embodiment. The wireless communication system 1b includes: the mobile station device 10; the macrocell base station device 20a; and the micro base station device 30b. Similar to FIGS. 2 and 6, the mobile station device 10 includes: the radio receiver 110; the reception antenna 111; the radio transmitter 120; the transmission antenna 121; and the controller 130. The controller 130 includes: the reception quality measurer 131; the CSG information storing unit 132; and the handover destination selector 133. The macrocell base station device 20a includes: the radio receiver 210; the reception antenna 211; the radio transmitter 220; the transmission antenna 221; and the controller 230a. The controller 230a includes: the handover processor 231; the CSG information canceller 234; and the CSG information reporter 235.

The micro base station device 30b includes: the radio receiver 310; the reception antenna 311; the radio transmitter 320; the transmission antenna 321; a controller 330b; and the network communication unit 340. Additionally, the controller 330b includes: the handover processor 331; a reception level measurer 332b; and a handover determining unit 333b. The same reference numerals (10, 20a, 40, 110 to 133, 210 to 240, 310 to 321, 331, and 340) are appended to elements shown in FIG. 9 corresponding to those shown in FIGS. 2 and 6, and explanations thereof are omitted here.

The reception level measurer 332b (communication state detector) measures the reception level of a signal transmitted by the mobile station device 10. Based on a result of the measurement by the reception level measurer 332b, the handover determining unit 333b determines whether or not the mobile station device 10 can perform a handover. Specifically, the handover determining unit 333b compares the reception level measured by the reception level measurer 332b to a predetermined threshold. If the measured reception level is lower than the threshold, the handover determining unit 333b determines that a handover is unavailable, and transmits the result of the measurement to the macrocell base station device 20a through the network communication unit 340 and the network 40.

Figure 10:
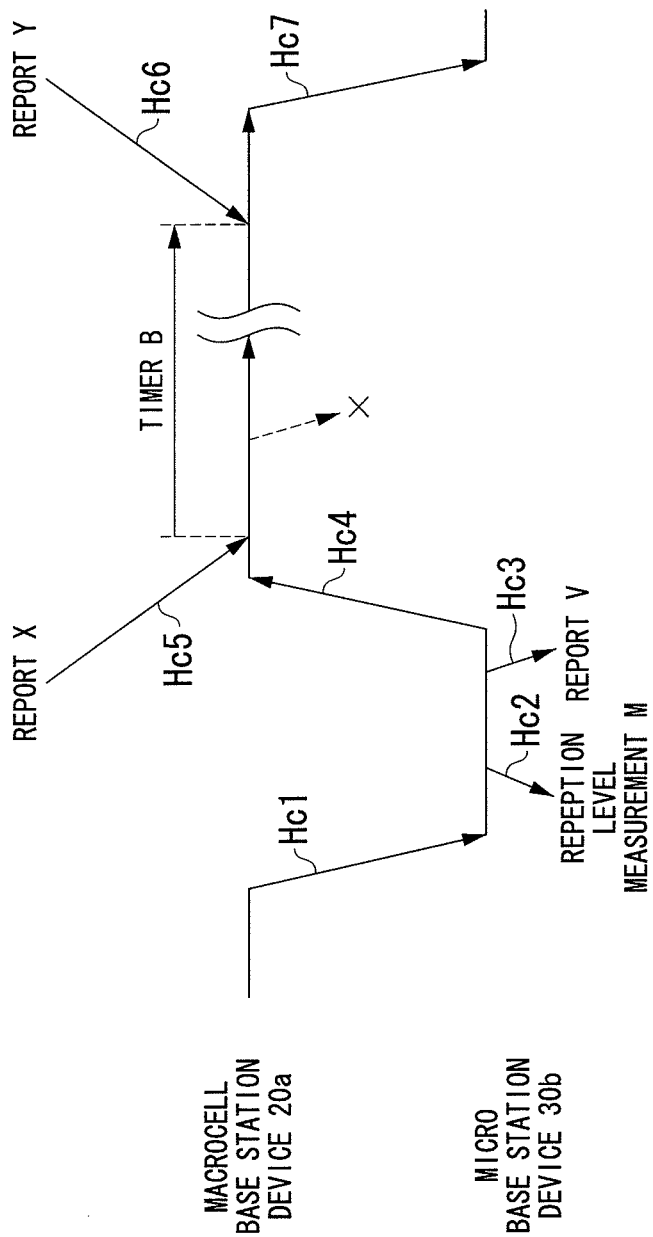
FIG. 10 is a diagram illustrating a serving state while the mobile station device 10 moves between the macrocell A and the CSG cell B according to the third embodiment.

FIG. 10 is a diagram illustrating an example of a serving state while the mobile station device 10 moves between the macrocell A and the CSG cell B according to the third embodiment. If the mobile station device 10 moves to the service area of the CSG cell B while communicating with the macrocell base station device 20a, and if the information of the CSG cell B as a handover target is included in the CSG information stored by the CSG information storing unit 132 of the mobile station device 10, the mobile station device 10 performs a handover to the micro base station device 30b for that CSG cell B (Hc1). Then, while the micro base station device 30b for the CSG cell B is in communication with the mobile station device 10, the reception level measurer 332b of the micro base station device 30b performs reception level measurement M of a signal from the mobile station device 10 (Hc2).

Upon receiving a result of the reception level measurement, the handover determining unit 333b transmits a report V indicating reception level information to the macrocell base station device 20*a* through the network communication unit 340 by using the network 40 such as a backhaul line, if the handover determining unit 333*b* determines that the reception level is lower than the predetermined threshold (Hc3). The CSG information reporter 235 of the macrocell base station device 20*a* receives, through the network communication unit 240, the report V of the reception level from the micro base station device 30*b* for the CSG cell B. Then, the CSG information reporter 235 prepares to report CSG information addressed to the mobile station device 10, which does not include the information of the CSG cell B.

Since the state of the communication between the mobile station device 10 and the micro base station device 30*b* is not favorable, the probability of performing a handover to the macrocell base station device 20*a* increases if the communication is continued as it is. If a handover is actually performed (Hc4), the macrocell base station device 20*a* transmits to the mobile station device 10, as a report X of new CSG information, CSG information not including the information of the CSG cell B, which has been prepared based on the reception level information from the micro base station device 30*b* (Hc5). At this time, the timer B of the CSG information canceller 234 of the macrocell base station device 20*a* starts to operate.

The mobile station device 10 receives the CSG information from which the information of the CSG cell B has been deleted, and the controller 130 thereof updates the CSG information stored by the CSG information storing unit 132. Even if the mobile station device 10 moves to the service area of the CSG cell B and tries to perform a handover, the information of the CSG cell B to be a handover target is not included in the CSG information stored by the CSG information storing unit 132. For this reason, the mobile station device 10 does not perform a handover to the micro base station device 30*b* for the CSG cell B, and maintains the state of being kept connected to the macro cell base station device 20*a*. The above operations can prevent such operations that immediately after a handover to the micro base station device 30*b* for the CSG cell is performed, a handover back to the macrocell base station device 20*a* is performed due to the low reception level.

If the reception level is higher than the predetermined threshold, the mobile station device 10 maintains the communication with the micro base station device 30*b* for the CSG cell B as it is. In this case, since the probability of performing the operation of a handover is small, the reception level information is not reported from the micro base station device 30*b* to the macrocell base station device 20*a* in the third embodiment.

Thus, only if the reception level is lower than the predetermined threshold, a report V of the reception level for updating the CSG information is reported from the micro base station device 30*b* to the macrocell base station device 20*a*.

Here, the reception level measured by the reception level measurer 332*b* of the micro base station device 30*b* may be the SNR (Signal to Noise power Ratio), the error rate, the reception filed strength, or the like.

Similar to the first embodiment, in the third embodiment, after the given duration TB of the timer B elapses, the CSG information canceller 234 of the macrocell base station device 20*a* causes the CSG information reporter 235 to transmit, toward the mobile station device 10, the CSG information restored so as to include the information of the CSG cell B (Hc6). In other words, the report Y of the CSG information for restoration is transmitted.

Figure 11:
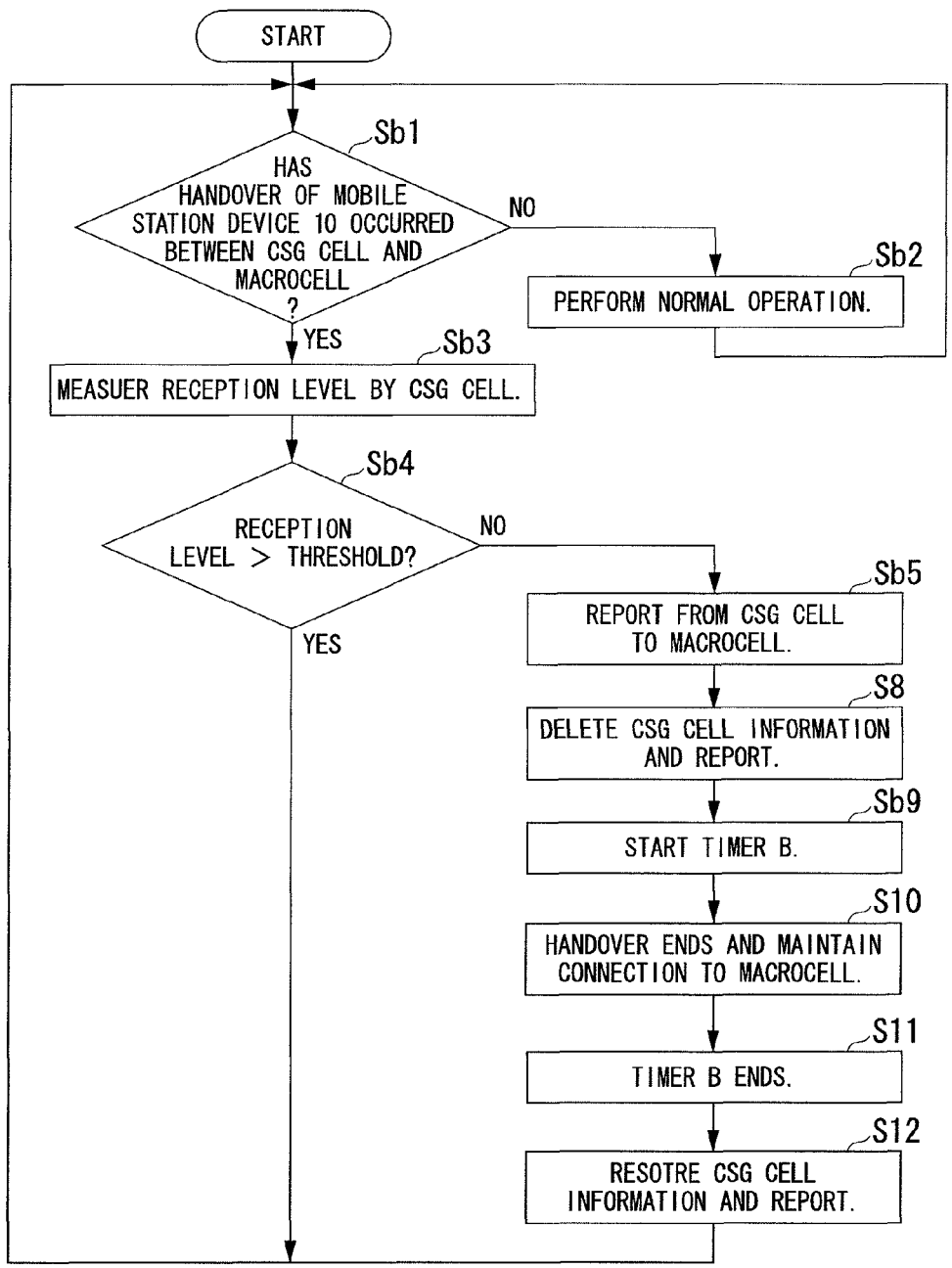
FIG. 11 is a flowchart illustrating operations by the macrocell base station device 20a and a micro base station device 30b according to the third embodiment.

FIG. 11 is a flowchart illustrating operations by the macrocell base station device 20*a* and the micro base station device 30*b* according to the third embodiment. The same reference symbols (S8, and S10 to S12) are appended to steps shown in FIG. 11 corresponding to those shown in FIG. 4. Firstly, the handover processor 331 of the microcell base station device 30*b* waits until a handover of the mobile station device 10 occurs between a CSG cell and a macrocell (Sb1: NO). If a handover occurs (Sb1: YES), the reception level measurer 332*b* of the micro base station device 30*b* for the CSG cell measures the reception level of a signal from the mobile station device 10 (Sb3). The handover determining unit 333*b* determines whether or not the measured reception level exceeds a predetermined threshold (Sb4). If it is determined that the measured reception level exceeds the threshold (Sb4: YES), the routine returns to step Sb1.

Additionally, if it is determined that the reception level does not exceed the threshold (Sb4: NO), a result of the determination is reported to the macrocell base station device 20*a* through the network 40 (Sb5). The CSG information reporter 235 of the macrocell base station device 20*a* receiving the report deletes the information of the micro base station device 30*b* that is the handover destination of the mobile station device 10. Then, the CSG information reporter 235 reports the CSG information to the mobile station device 10 through the radio transmitter 220 (S8). Then, the CSG information canceller 234 starts the timer B (Sb9). The mobile station device 10 stores, in the CSG information storing unit 132, the CSG information from which the information of the micro base station device 30*b* has been deleted. Based on the CSG information, the mobile station device 10 selects a handover destination. For this reason, the mobile station device 10 prevents a handover from occurring, and thereby maintains the connection to the macrocell base station device 20 for the macrocell A (S10).

If time passes, and the duration counted by the timer B becomes the predetermined given duration TB, the timer B ends (S11). The CSG information canceller 234 restores the CSG information from which the information of the micro base station device 30*b* has been deleted in step S8 to the original CSG information. Then, the CSG information canceller 234 causes the CSG information reporter 235 to report the restored CSG information to the mobile station device 10, and returns to step Sb1.

Fourth Embodiment

In the fourth embodiment, explanations are given with respect to a case where CSG information reported from a macrocell base station device to a mobile station device is controlled according to the transmission power level of the mobile station device if the mobile station device performs a handover between the macrocell base station device and a micro base station device for a CSG cell disposed in the macrocell.

Figure 12:
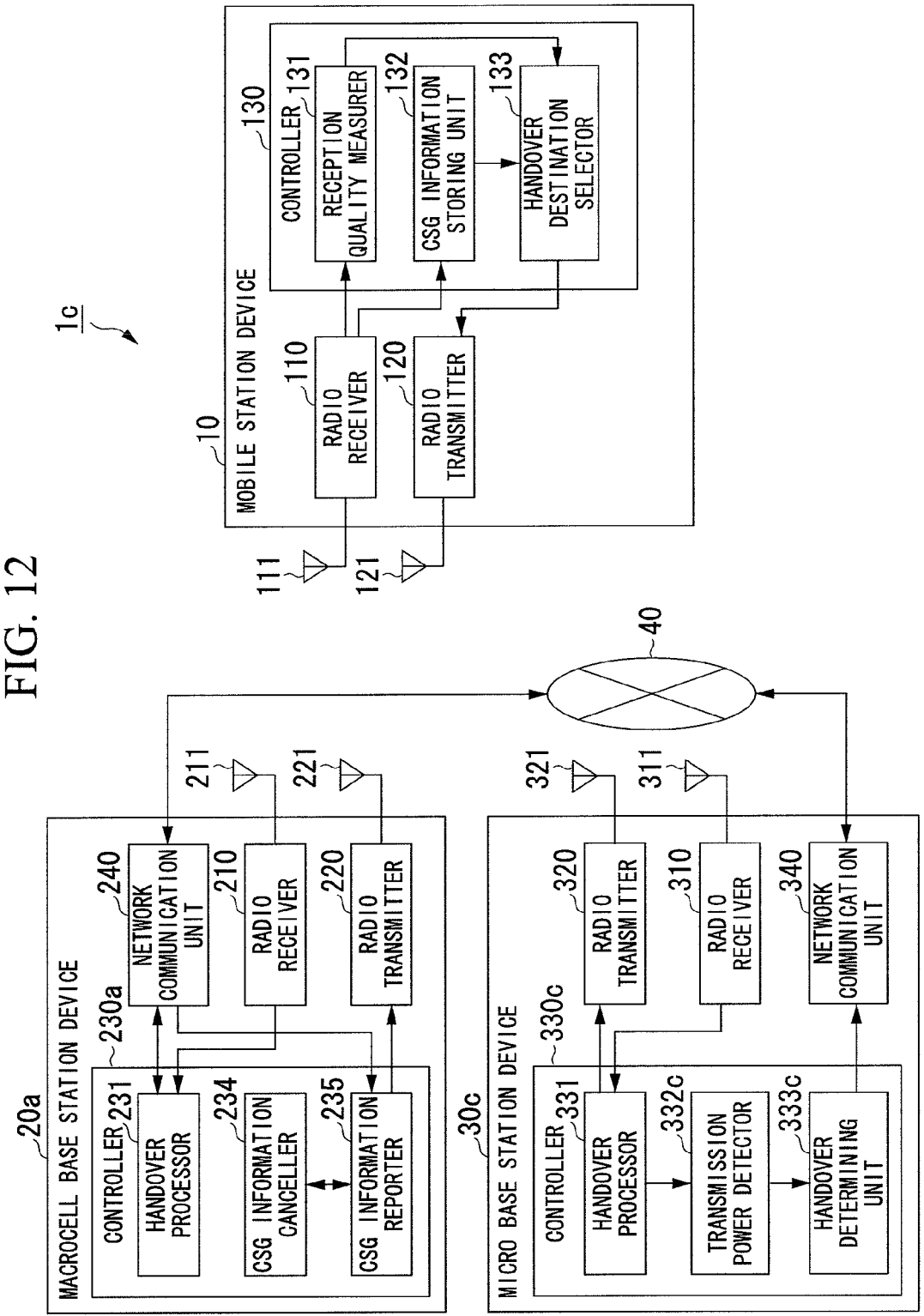
FIG. 12 is a schematic block diagram illustrating a configuration of a wireless communication system 1c according to a fourth embodiment of the present invention.

FIG. 12 is a schematic block diagram illustrating a configuration of the wireless communication system 1*c* according to the fourth embodiment. The wireless communication system 1*c* includes: the mobile station device 10; the macrocell base station device 20*a*; and a micro base station device 30*c*. Similar to FIGS. 2 and 6, the mobile station device 10 includes: the radio receiver 110; the reception antenna 111; the radio transmitter 120; the transmission antenna 121; and the controller 130. The controller 130 includes: the reception quality measurer 131; the CSG information storing unit 132; and the handover destination selector 133.

Similar to FIG. 6, the macrocell base station device 20*a* includes: the radio receiver 210; the reception antenna 211; the radio transmitter 220; the transmission antenna 221; the controller 230a; and the network communication unit 240. The controller 230a includes: the handover processor 231; the CSG information canceller 234; and the CSG information reporter 235. The micro base station device 30c includes: the radio receiver 310; the reception antenna 311; the radio transmitter 320; the transmission antenna 321; a controller 330c; and the network communication unit 340. The controller 330c includes: the handover processor 331; a transmission power detector 332c; and a handover determining unit 333c.

The same reference numerals (10, 110 to 133, 20a, 210 to 221, 230a, 231 to 235, 240, 310 to 321, 331, and 340) are appended to elements shown in FIG. 12 corresponding to those shown in FIG. 6, and explanations thereof are omitted here. The transmission power detector 332c (communication state detector) detects the transmission power at the time of the mobile station device 10 transmitting a signal, from a power control command from the micro base station device 30c to the mobile station device 10. The handover determining unit 333c determines based on a result of the detection by the transmission power detector 332c whether or not the mobile station device 10 can perform a handover. Specifically, the handover determining unit 333c compares the transmission power level detected by the transmission power detector 332c to a predetermined threshold. If the detected transmission power level is lower than the threshold, the handover determining unit 333c determines that the handover is unavailable, and transmits the result of the determination to the macrocell base station device 20a through the network communication unit 340 and the network 40.

Figure 13:
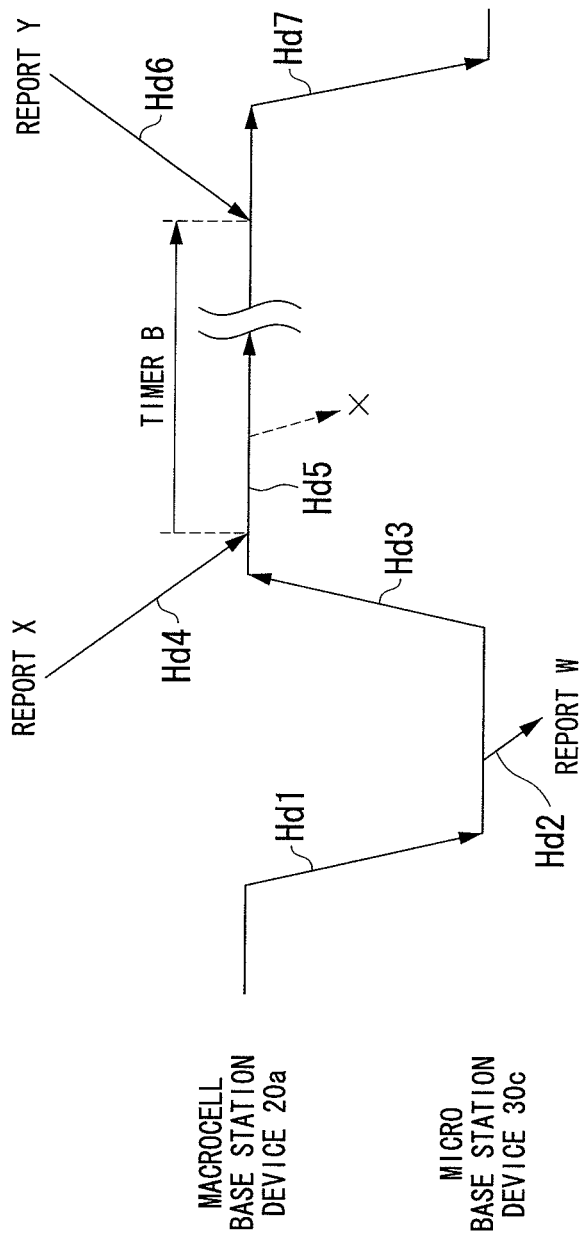
FIG. 13 is a diagram illustrating a serving state while the mobile station device 10 moves between the macrocell A and the CSG cell B according to the fourth embodiment.

FIG. 13 is a diagram illustrating an example of a serving state while the mobile station device 10 moves between the macrocell A and the CSG cell B according to the fourth embodiment. If the mobile station device 10 moves to the service area of the CSG cell B while communicating with the macrocell base station device 20a, and if the information of the CSG cell B is included in the CSG information stored by the mobile station device 10, the mobile station device 10 performs a handover to the micro base station device 30c for that CSG cell B (Hd1). Then, the transmission power detector 332c monitors the transmission power of the mobile station device 10 while the mobile station device 10 is in communication with the micro base station device 30c.

If the handover determining unit 333c of the micro base station device 30c determines that the transmission power of the mobile station device 10 is greater than a predetermined threshold, the handover determining unit 333c determines that there is a possibility that the mobile station device 10 will perform a handover to the macrocell base station device 20a. Then, the handover determining unit 333c transmits, to the macrocell base station device 20a, a report W of the transmission level indicating the transmission power of the mobile station device 10 through the network 40 such as a backhaul line (Hd2).

The macrocell base station device 20a receives, from the micro base station device 30c, the transmission level information W by using the network 40 such as a backhaul line. Upon receiving the transmission power level information W, the macrocell base station device 20a determines that there is a high possibility that the handover operation is performed since the state of the communication between the mobile station device 10 and the micro base station device 30c is not favorable. Then, the macrocell base station device 20a prepares to report, to the mobile station device 10, CSG information not including the information of the CSG cell B.

The fact that the transmission power of the mobile station device 10 is large indicates that the distance to the micro base station device 30c for the CSG cell B is large or that the radio wave environments are not favorable. For this reason, if the communication is continued, there is a high possibility that a handover to the macrocell base station device 20a for the macrocell A will be performed. If the handover is actually performed (Hd3), based on the transmission power level information from the micro base station device 30c, the macrocell base station device 20a reports, to the mobile station device 10, the CSG information not including the information of the CSG cell B, which has been prepared (Hd4). The CSG information to be reported corresponds to the report X of the new CSG information shown in FIG. 13. Here, the timer C of the macrocell base station device 20c starts to operate.

The mobile station device 10 receives the CSG information from which the information of the CSG cell B has been deleted, and updates the CSG information stored by the CSG information storing unit 132. Even if the mobile station device 10 moves to the service area of the CSG cell B and tries to perform a handover, the information of the CSG cell B as that handover target is not included in the CSG information stored by the CSG information storing unit 132. For this reason, the mobile station device 10 does not perform a handover to the micro base station device 30c for the CSG cell B, and maintains the state of being kept connected to the macro cell base station device 20a for the macrocell A. The above operations can prevent such operations that immediately after a handover to the micro base station device 30c for the CSG cell is performed, a handover back to the macrocell base station device 20a is performed due to a poor radio wave environment.

If the transmission power level of the mobile station device 10 in communication with the micro base station device 30c is smaller than the predetermined threshold, the distance to the small base station device 30c is small, and therefore the communication with the micro base station device 30c for the CSG cell B is maintained as it is. Since there is a low possibility that handover operation will be performed, the transmission power level information W is not reported from the micro base station device 30c to the macrocell base station device 20a.

Thus, only if the transmission power level is greater than the predetermined threshold, the transmission power level report W for updating the CSG information is reported from the micro base station device 30c for the CSG cell B to the macrocell base station device 20a for the macrocell A.

Similar to the first embodiment, in the fourth embodiment, after the given duration TB of the timer B elapses, the CSG information canceller 234 of the macrocell base station device 20a causes the CSG information reporter 235 to report, to the mobile station device 10, the CSG information restored so as to include the information of the CSG cell B (Hd6). In other words, the report Y of the CSG information for restoration is transmitted.

Figure 14:
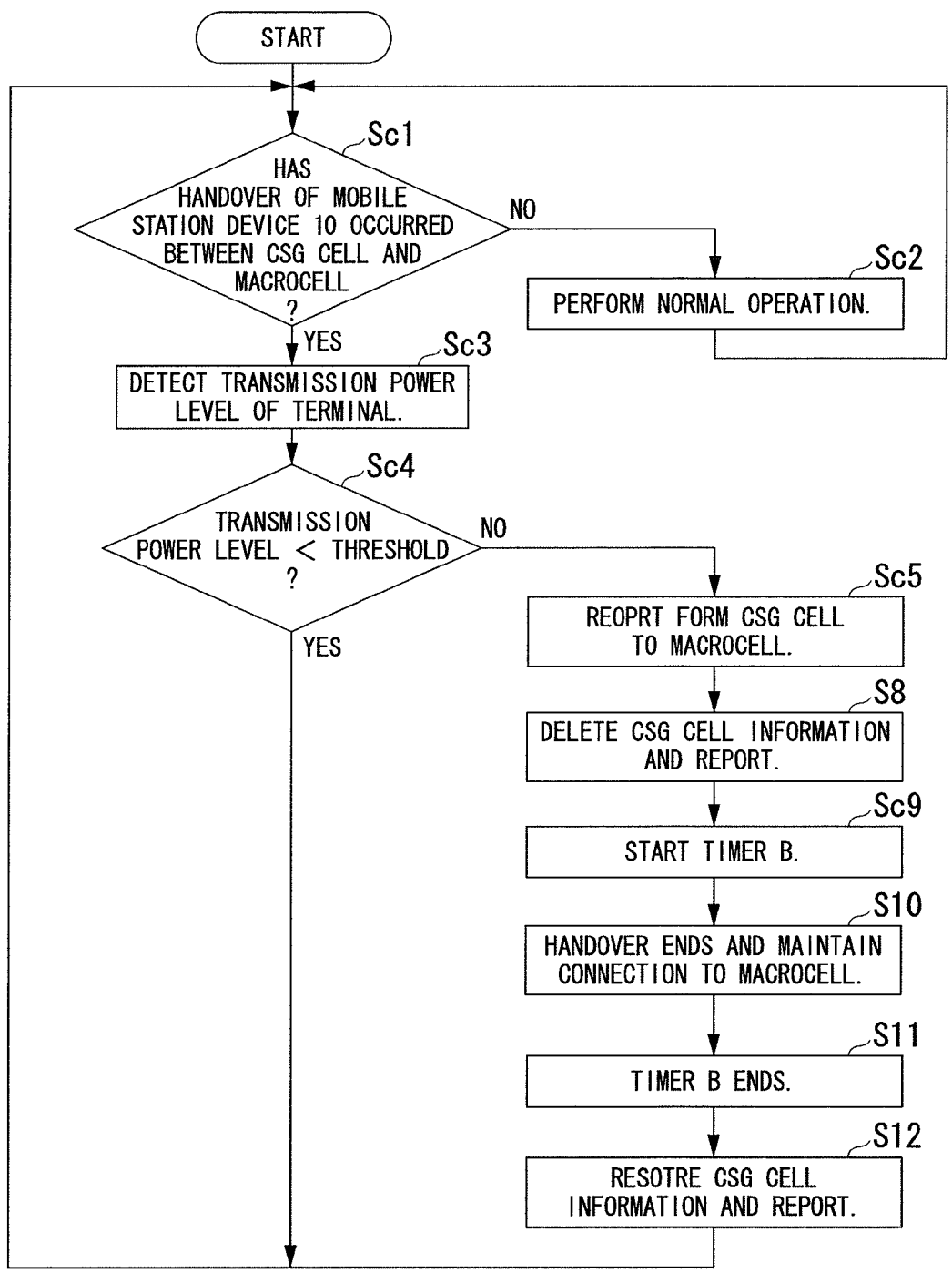
FIG. 14 is a flowchart illustrating operations by the macrocell base station device 20a and a micro base station device 30c according to the fourth embodiment.

FIG. 14 is a flowchart illustrating operations by the macrocell base station device 20a and the micro base station device 30c according to the fourth embodiment. In FIG. 14, the same reference symbols (58, and S10 to S12) are appended to steps corresponding to those shown in FIG. 4. Firstly, the handover processor 331 of the microcell base station device 30c waits until a handover of the mobile station device 10 occurs between a CSG cell and a macrocell (Sc1: NO). If a handover occurs (Sc1: YES), the transmission power detector 332c of the micro base station device 30c for the CSG cell detects the transmission power at the time that the mobile station device 10 transmits a signal (Sc3). The handover determining unit 333c determines whether or not the detected transmission power level exceeds a predetermined threshold (Sc4). If it is determined that the detected transmission power level does not exceed the predetermined threshold (Sc4: YES), the routine returns to step Sc1.

Additionally, if it is determined in step Sc4 that the transmission power level exceeds the threshold (Sc4: NO), a result of the determination is reported to the macrocell base station device 20a through the network 40 (Sc5). The CSG information reporter 235 of the macrocell base station device 20a receiving the report deletes, from the CSG information, the information of the micro base station device 30c that is the handover destination of the mobile station device 10. Then, the CSG information reporter 235 reports the CSG information to the mobile station device 10 through the radio transmitter 220 (S8). The n, the CSG information canceller 234 starts the timer B (Sc9). The mobile station device 10 stores, in the CSG information storing unit 132, the CSG information from which the information of the micro base station device 30c has been deleted. Based on the CSG information, the mobile station device 10 selects a handover destination. For this reason, the mobile station device 10 prevents a handover from occurring, and thereby maintains the connection to the macrocell base station device 20a for the macrocell A (S10).

If time passes, and the duration counted by the timer B becomes the predetermined given duration TB, the timer B ends (S11). The CSG information canceller 234 restores the CSG information from which the information of the micro base station device 30c has been deleted in step S8 to the original CSG information. Then, the CSG information canceller 234 causes the CSG information reporter 235 to report the restored CSG information to the mobile station device 10, and returns to step Sc1.

Fifth Embodiment

Figure 15:
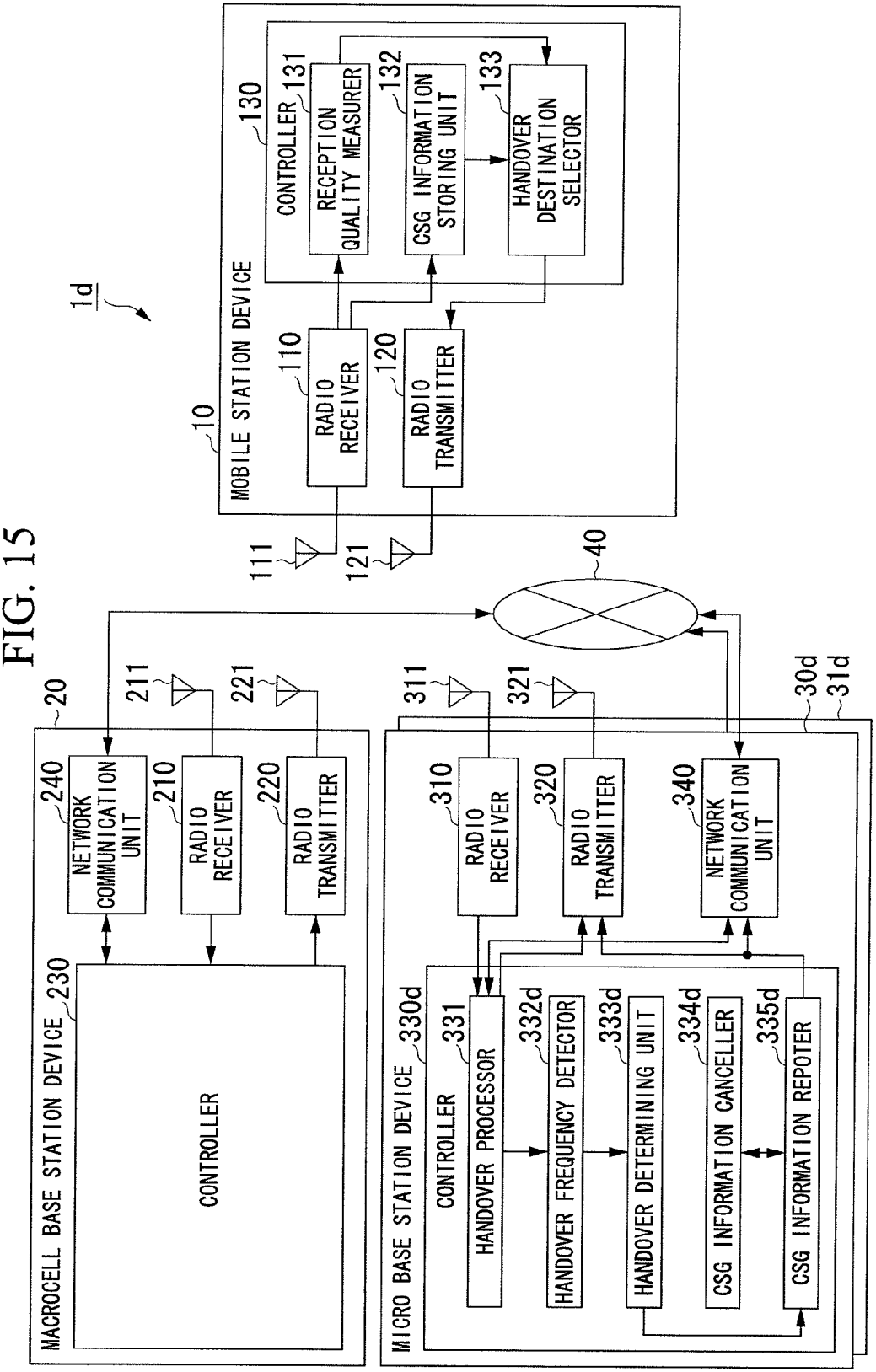
FIG. 15 is a schematic block diagram illustrating a configuration of a wireless communication system 1d according to a fifth embodiment of the present invention.

In the fifth embodiment, explanations are given with respect to a case where multiple CSG cells (CSG cell B and CSG cell C) are included in the macrocell A, and a handover is repeatedly performed between the micro base station device 30d and 31d for those CSG cells. FIG. 15 is a schematic block diagram illustrating a configuration of the wireless communication system 1d according to the fifth embodiment. The wireless communication system 1d includes: the mobile station device 10; the macrocell base station device 20; a micro base station device 30d; and a micro base station device 31d. Similar to FIGS. 2 and 6, the mobile station device 10 includes: the radio receiver 110; the reception antenna 111; the radio transmitter 120; the transmission antenna 121; and the controller 130. The controller 130 includes: the reception quality measurer 131; the CSG information storing unit 132; and the handover destination selector 133.

The macrocell base station device 20 includes: the radio receiver 210; the reception antenna 211; the radio transmitter 220; the transmission antenna 221; the controller 230; and the network communication unit 240. Similar to the controller 230 shown in FIG. 2, the controller 230 includes: the handover processor 231; the handover frequency detector 232; the handover determining unit 233; the CSG information canceller 234; and the CSG information reporter 235. However, illustrations of those elements are omitted here. Each of the micro base station devices 30d and 31d includes: the radio receiver 310; the reception antenna 311; the radio transmitter 320; the transmission antenna 321; a controller 330d; and the network communication unit 340. The controller 330d includes: the handover processor 331; a transmission frequency detector 332d; a handover determining unit 333d; a CSG information canceller 334d; and a CSG information reporter 335d.

The same reference numerals (10, 110 to 133, 20, 210 to 240, 310 to 321, 331, and 340) are appended to elements shown in FIG. 15 corresponding to those shown in FIG. 2, and explanations thereof are omitted here. The controller 230d controls each unit of the macrocell base station device 20d. The handover frequency detector 332d is a communication state detector of the fifth embodiment which detects the communication state between the mobile station device 10 and the micro base station device. In the fifth embodiment, the handover frequency detector 332d counts the number of handovers performed by the handover processor 331 of the mobile station device 10 for a duration from the initial handover until the timer C ends (duration TC), thereby detecting a frequency at which the mobile station device 10 performs a handover. Based on a result of the detection by the handover frequency detector 332d, the handover determining unit 333d determines whether or not the mobile station device 10 can perform a handover. Specifically, every time the handover frequency detector 332d detects a handover, the handover determining unit 333d compares the number detected from the time the timer C starts to a predetermined threshold (given number). If the detected number exceeds the threshold, the handover determining unit 333d determines that a handover is unavailable.

The CSG information reporter 335 (reporter) generates CSG information according to a result of the determination by the handover determining unit 333d, and reports the generated CSG information to the mobile station device 10. In other words, the CSG information reporter 335d generates CSG information including a list that is information indicating micro base station devices other than the micro base station device for which it has been determined that a handover is unavailable as a result of the determination by the handover determining unit 333d. Then, the CSG information reporter 335d transmits the generated CSG information to the mobile station device 10 through the radio transmitter 320.

If a predetermined duration (duration TB) elapses from the time the CSG information reporter 335d generates and reports the CSG information according to the result of the determination by the handover determining unit 333d, the CSG information canceller 334d generates CSG information indicating that a handover to the micro base station is available, regardless of the result of the determination, and causes the CSG information reporter 335d to report the generated CSG information.

Figure 16:
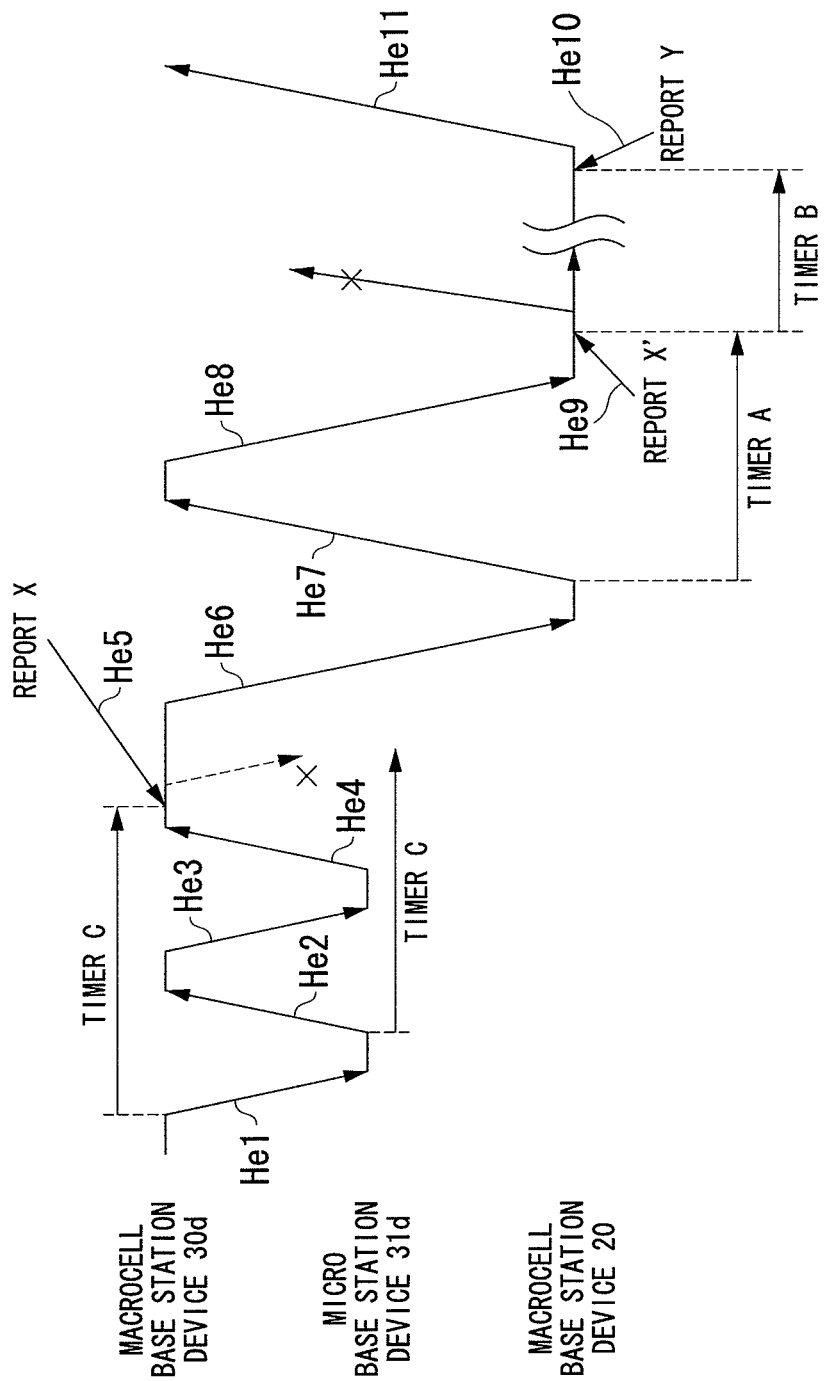
FIG. 16 is a diagram illustrating a serving state while the mobile station device 10 moves among the macrocell A, the CSG cell B, and a CSG cell C according to the fifth embodiment.

FIG. 16 is a diagram illustrating an example of a serving state while the mobile station device 10 moves between the macrocell A and the CSG cell B according to the fifth embodiment. If the mobile station device 10 in communication performs a handover from the micro base station device 30d for the CSG cell B to the micro base station device 31d for the CSG cell C (He1), the timer C included in the handover frequency detector 332d of the micro base station device 30d starts to operate. Further, if a handover from the micro base station device 31d for the CSG cell C to the micro base station device 30d for the CSG cell B (He1) is performed, the timer C included in the handover frequency detector 332d of the micro base station device 31d starts to operate.

Then, if a handover is repeatedly performed the number of times that is more than a predetermined threshold while each timer C is in operation, such as the case where a handover from the micro base station device 30d for the CSG cell B to the micro base station device 31d for the CSG cell C (He3) and a handover from the micro base station device 31d for the CSG cell C to the micro base station device 30d for the CSG cell B (He4) are performed, the handover determining unit 333d of the micro base station device 30d for the CSG cell B or the micro base station device 31*d* for the CSG cell C determines that the current state becomes a state where a handover is repeatedly performed. Then, the micro base station device having performed the determination reports, to the mobile station device 10, new CSG information for updating the CSG information stored by the mobile station device 10. It is assumed here that the handover determining unit 333*d* of the micro base station device 30*d* determines that the current state becomes the state where a handover is repeatedly performed. In this case, the CSG information reporter 335*d* of the micro base station device 30*d* generates new CSG information for updating the CSG information, and reports the generated CSG information to the mobile station device 10 through the radio transmitter 320 (He5). In other words, a report X of the CSG information from which the information of the CSG cell C has been deleted is transmitted. Here, the timer C stops operating. Information of the CSG cell C that is the destination of the repetitive handover is not included in the new CSG information to be reported, and only the information of the CSG cell B is included therein. The new CSG information generated by the CSG information reporter 335*d* and transmitted to the mobile station device 10 is also reported to the macrocell base station device 20 via the network communication unit 340 and the network 40.

Only the information of the CSG cell B is included in the CSG information stored by the CSG information storing unit 132 of the mobile station device 10. For this reason, even if the mobile station device 10 repeatedly moves between the service areas of the CSG cell B and the CSG cell C, the mobile station device 10 does not perform a handover to the micro base station device 31*d* for the CSG cell C. If the mobile station device 10 moves to the service area of the CSG cell C, the mobile station device 10 performs a handover to the macrocell base station device 20 for the macrocell A (He6). Then, if the mobile station device 10 performs a handover from the macrocell base station device 20 for the macrocell A to the micro base station device 30*d* for the CSG cell B (He7), the timer A included in the handover frequency detector 232 of the macrocell base station device 20 starts to operate.

If the mobile station device 10 continues to move while the timer A is in operation, such that the mobile station device 10 repeatedly performs a handover between the micro base station device 30*d* for the CSG cell B and the macrocell base station device 20 for the macrocell A, the operations are similar to those of the first embodiment (FIG. 3). In other words, the mobile station device 10 receives new CSG information from the macrocell base station device 20, and updates the CSG information stored by the CSG information storing unit 132 (He9). In other words, the mobile station device 10 transmits a report X' of the CSG information from which the information of the CSG cell B has been deleted. Here, the information of the CSG cell B which is the destination of the repeated handover is not included in the CSG information (He9) to be reported from the macrocell base station device 20 to the mobile station device 10. Further, the information of the CSG cell C is not included therein either according to the CSG information (He5) previously reported from the micro base station 30*d*. In other words, the new CSG information does not include information of a CSG cell to be a handover target.

At this time, the timer A stops operating, and the timer B included in the handover frequency detector 232 of the macrocell base station device 20 starts to operate.

The mobile station device 10 receives the new CSG information not including the CSG cell to be a handover target, and therefore the mobile station device 10 does not perform a handover to the micro base station device 30*d* for the CSG cell B. Consequently, the mobile station device 10 is stably connected to the macrocell base station device 20 for the macrocell A.

Thus, if a handover is repeatedly performed among multiple micro base station devices for CSG cells, the mobile station device 10 first stores two CSG cell informations. After a period of time, the mobile station device 10 stores information of only one CSG cell. Further, if the mobile station device 10 is in the state of continuing movement, the mobile station device 10 finally stores no information of a CSG cell to be a handover target. Such control is performed.

In this example, the CSG information stored by the mobile station device 10 is sequentially controlled so as not to include the information of the CSG cell C first, and not to include the information of the CSG cell B next. If a handover is repeatedly performed between the micro base station device 20*a* for the CSG cell B and the micro base station device 31*d* for the CSG cell C, however, new CSG information from which the information of the CSG cell B and the information of the CSG cell C are deleted may be reported simultaneously with the new CSG information to be reported from the micro base station device 30*d* for the CSG cell B. In this case, CSG cell information is not included in the CSG information stored by the mobile station device 10. For this reason, the mobile station device 10 immediately performs a handover to the macrocell base station device 20 for the macrocell A, and maintains the connection to the macrocell base station device 20 without performing handover operation for a while.

Similar to the first embodiment, in the fifth embodiment, after the given duration TB of the timer B elapses, the CSG information canceller 234 of the macrocell base station device 20 restores the deleted information of the CSG cell B or the CSG cell C so as to be included in the CSG information, and reports the restored information (He10) to the mobile station device 10, thereby enabling handover operation. In other words, the report Y of the CSG information for restoration is transmitted. Regarding the control for restoring the CSG information, the two informations of the CSG cells may be added sequentially or simultaneously.

First Modified Example

In the above first to fifth embodiments, control has been performed by deleting or adding information of a CSG cell to be a handover target from or to CSG information. However, information indicating availability of handover may be added to CSG information, and thereby the CSG information may be reported.

Specifically, it is predetermined that "1" is to be added if a handover is available and "0" is to be added if a handover is unavailable. In addition to the information of a CSG cell, "1" or "0" is added to the CSG information, and thereby the CSG information is reported.

Hereinafter, an example is taken where there are a CSG cell B, a CSG cell C, a CSG cell D, and the like as CSG cells, and there are CSG_b, CSG_c, CSG_d, and the like as information for identifying these CSG cells. In this case, (CSG_b, CSG_c, CSG_d, . . . ) is reported as the new CSG information X of the first embodiment. In addition to this information, (0, 1, 1, . . . ) indicating availability of a handover is reported. The information indicating the availability of a handover is associated with each CSG cell. In this example, "0" for the CSG cell B indicates that a handover is unavailable, and "1" for the CSG cell D indicates that a handover is available.

The mobile station device 10 receives this information and updates the CSG information stored in the CSG information storing unit 131. In view of this information, a handover to the micro base station device 30d is indicated by "0," and therefore the micro base station device 30d is not targeted for the handover. The handover to the micro base station device 31d is indicated by "1," and therefore it is understood that the micro base station device 31d is targeted for the handover. The mobile station device 10 receives this information indicating the availability of a handover, thereby being able to prevent operation of a handover to the micro base station device 30d.

Second Modified Example

The case in which a handover is repeatedly performed between the cells of the same type has been explained in the first to fifth embodiments. There is another case in which the mobile station device 10 moves at high speed and thereby repeatedly performs a handover for a short period of time between a macrocell base station device for a macrocell and any of multiple different micro base station devices for CSG cells. In this case, CSG information to be reported from a macrocell base station is made empty, in other words, CSG information including no information of a CSG cell to be a handover target, is reported. Thereby, a control of preventing a handover to the micro base station device for the CSG cell may be performed. Additionally, as in the aforementioned first modified example, information indicating that a handover to any of the micro base station devices for CSG cells is unavailable may be added to CSG information to be reported, in format in which information indicating the availability of a handover is added to CSG information to be reported. Thereby, the CSG information may be reported.

Further, it is not limited to the macrocell base station which reports new CSG information for preventing handover operation. The new CSG information may be reported from a micro base station device for a CSG cell or open cell (microcell which an unlimited number of users may use).

Additionally, a computer readable recording medium may record a program for implementing: the controller 130, the controller 230, and the controller 330, which are shown in FIG. 2; the controller 130, the controller 230a, and the controller 330a, which are shown in FIG. 6; the controller 130, the controller 230a, and the controller 330b, which are shown in FIG. 9; the controller 130, the controller 230a, and the controller 330c, which are shown in FIG. 12; the controller 130, the controller 230, and the controller 330d, which are shown in FIG. 15. Then, the process of each unit may be performed by a computer system reading and executing the program recorded in the recording medium. Alternatively, the process of each unit may be executed by dedicated hardware. Here, the "computer system" includes an OS and hardware, such as a peripheral device.

Further, the "computer readable recording medium" includes a portable medium such as a flexible disc, a magneto-optical disc, a ROM, and a CD-ROM, and a storage device such as a hard disk built in the computer system. The "computer readable recording medium" may include a medium that dynamically stores a program for a short period of time, such as a communication line used when a program is transmitted via a network such as the Internet or a communication line such as a telephone line. Additionally, the "computer readable recording medium" may include a medium that stores a program for a predetermined period of time, such as a volatile memory built in a computer system serving as a server or client when the program is transmitted via a network such as the Internet or a communication line such as a telephone line. Additionally, the program may be a program for implementing part of the aforementioned functions. Further, the program may be a program that can implement the aforementioned functions in combination with a program already recorded on the computer system.

Embodiments of the present invention have been explained above with reference to the drawings. However, specific configurations are not limited to those embodiments, and various design modifications may be made without departing from the scope of the present invention.

INDUSTRIAL APPLICABILITY

The present invention is suitable to be used for a mobile communication system such as a mobile telephone network, but is not limited thereto.

DESCRIPTION OF REFERENCE NUMERALS 1, 1a, 1b, 1c, and 1d: wireless communication system
10: mobile station device
110: radio receiver
111: reception antenna
120: radio transmitter
121: transmission antenna
130: controller
131: reception quality measurer
132: CSG information storing unit
133: handover destination selector
20 and 20a: macrocell base station device
210: reception antenna
220: radio transmitter
221: transmission antenna
230 and 230a: controller
231: handover processor
232: handover frequency detector
233: handover determining unit
234: CSG information canceller
235: CSG information reporter
240: network communication unit
30, 30a, 30b, 30c, and 30d: micro base station device
310: radio receiver
311: reception antenna
320: radio transmitter
321: transmission antenna
330, 330a, 330b, 330c, and 330d: controller
331: handover processor
332a and 332d: handover frequency detector
332b: reception level measurer
332c: transmission power detector
333a, 333b, 333c, and 333d: handover determining unit
334d: CSG information canceller
335d: CSG information reporter
340: network communication unit

The invention claimed is:
1. A wireless communication system comprising:
a macrocell base station device;
a micro base station device serving a cell having a region including at least a part of a region of a cell served by the macrocell base station device; and
a mobile station device,
wherein one of the macrocell base station device and the micro base station device comprises:
a reporter configured to report, to the mobile station device, micro base station information indicating one or more micro base station devices to which the mobile station device is enabled to perform a handover, and the mobile station device comprises:

a handover destination selector configured to select a handover destination from among the one or more micro base station devices based on the micro base station information reported, wherein one of the macrocell base station device and the micro base station device comprises:

a communication state detector configured to detect a frequency of handover instances which the mobile station device has performed between the mobile station device and the micro base station device;

a handover determining unit configured to determine, based on a result of detection by the communication state detector, whether handover to the micro base station is to be enabled for the mobile station device, and the reporter is configured to generate and report the micro base station information based on a result of determination by the handover determining unit, wherein the reporter is configured to generate and report, when a predetermined duration elapses from the time the micro base station information is generated and reported, micro base station information indicating that a handover to the micro base station device is enabled, regardless of the result of the detection by the communication state detector.

2. The wireless communication system according to claim 1, wherein the communication state detector is included in the macrocell base station device.

3. The wireless communication system according to claim 2, wherein the communication state detector is configured to detect, for each of a plurality of micro base station devices, a frequency of handover instances which the mobile station device has performed to the micro base station device, and the handover detector included in the macrocell base station device is configured to determine, based on a result of detection of the frequency of the handovers, whether or not a handover to each of the micro base station devices is to be enabled.

4. The wireless communication system according to claim 1, wherein the micro base station device comprises the communication state detector and the handover determining unit, the macrocell base station device comprises the reporter, and the reporter is configured to generate and report the micro base station information based on the result of the detection.

5. The wireless communication system according to claim 1, wherein the micro base station device comprises the communication state detector and the handover determining unit, the macrocell base station device comprises the reporter, and the reporter is configured to generate and report the micro base station information based on the result of the detection.

6. The wireless communication system according to claim 1, further comprising:

a plurality of micro base station devices, wherein each of the micro base station devices comprises the reporter, the communication state detector, and the handover determining unit.

7. The wireless communication system according to claim 1, wherein the communication state detector detects the frequency of handover instances by counting the number of handovers performed between the mobile station device and the base station device for a duration from an initial handover until a predetermined time period has elapsed.

* * * * *